United States Patent
Roche et al.

[15] 3,659,945
[45] May 2, 1972

[54] SCANNING MONOCHROMATORS

[72] Inventors: John M. Roche, West Redding; Rene C. Sawyer, Jr., Shelton, both of Conn.

[73] Assignee: The Perkin-Elmer Corporation, Norwalk, Conn.

[22] Filed: Nov. 19, 1969

[21] Appl. No.: 878,102

[52] U.S. Cl. .................................356/100, 350/162 R
[51] Int. Cl. .................................G01j 3/06, G01j 3/18
[58] Field of Search ..............356/88, 89, 94–101, 356/51, 79, 93; 350/162

[56] References Cited

UNITED STATES PATENTS

| | | | |
|---|---|---|---|
| 3,306,158 | 2/1967 | Makabe et al. | 356/94 |
| 3,390,604 | 7/1968 | Makabe | 356/94 X |
| 3,433,557 | 3/1969 | McPherson | 356/100 X |

OTHER PUBLICATIONS

Herscher: " A Double-Beam Automatic Prism-Grating Infrared Spectrophotometer" Spectrochimica Acta, No. 11, 1959, pages 901–908

*Primary Examiner*—Ronald L. Wibert
*Assistant Examiner*—F. L. Evans
*Attorney*—Edward R. Hyde, Jr.

[57] ABSTRACT

A scanning monochromator includes a plurality of diffraction gratings mounted on a rotatable turret, so that each grating may be moved and precisely indexed into operative position. Each grating so positioned is angularly rotated about its axis by the same scanning arm, driven by a cam having two similar (but different) contours for producing one of two similar scanning functions for the various gratings. Preferably more interchangeable order-separating filters than gratings are included to insure complete and efficient filtering (e.g., 14 filters for 7 gratings). Both the stepping of the grating turret and of the filters (e.g., on a filter wheel) are controlled by (digital) signals, derived from the actual wavenumber being separated, as precisely read by (coarse and fine) digital encoder discs on the wavenumber scanning driving shafts (before and after a large-ratio reduction system). The digital control signals and a signal indicating the operative grating provide a readout of the wavenumber, directly usable by data processing apparatus. The closed loop digital nature of the control signals are free of any non-systematic errors, and allow the instrument to be "indexed" to any desired wavenumber (and then "instructed" to scan to any other wavenumber automatically).

6 Claims, 15 Drawing Figures

Patented May 2, 1972

INVENTORS:
John M. Roche
Rene C. Sawyer
BY
Daniel R. Levinson

ATTORNEY.

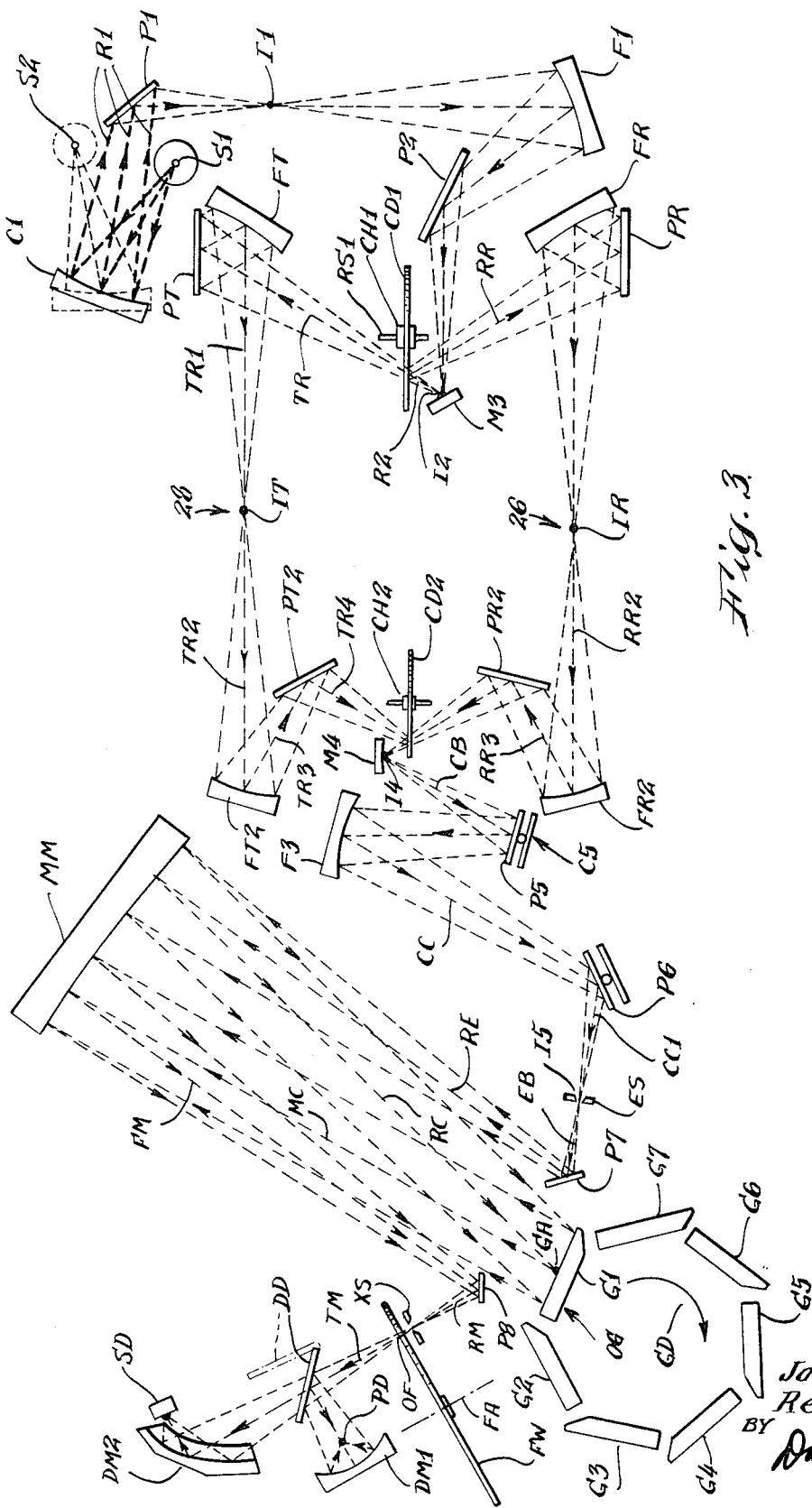

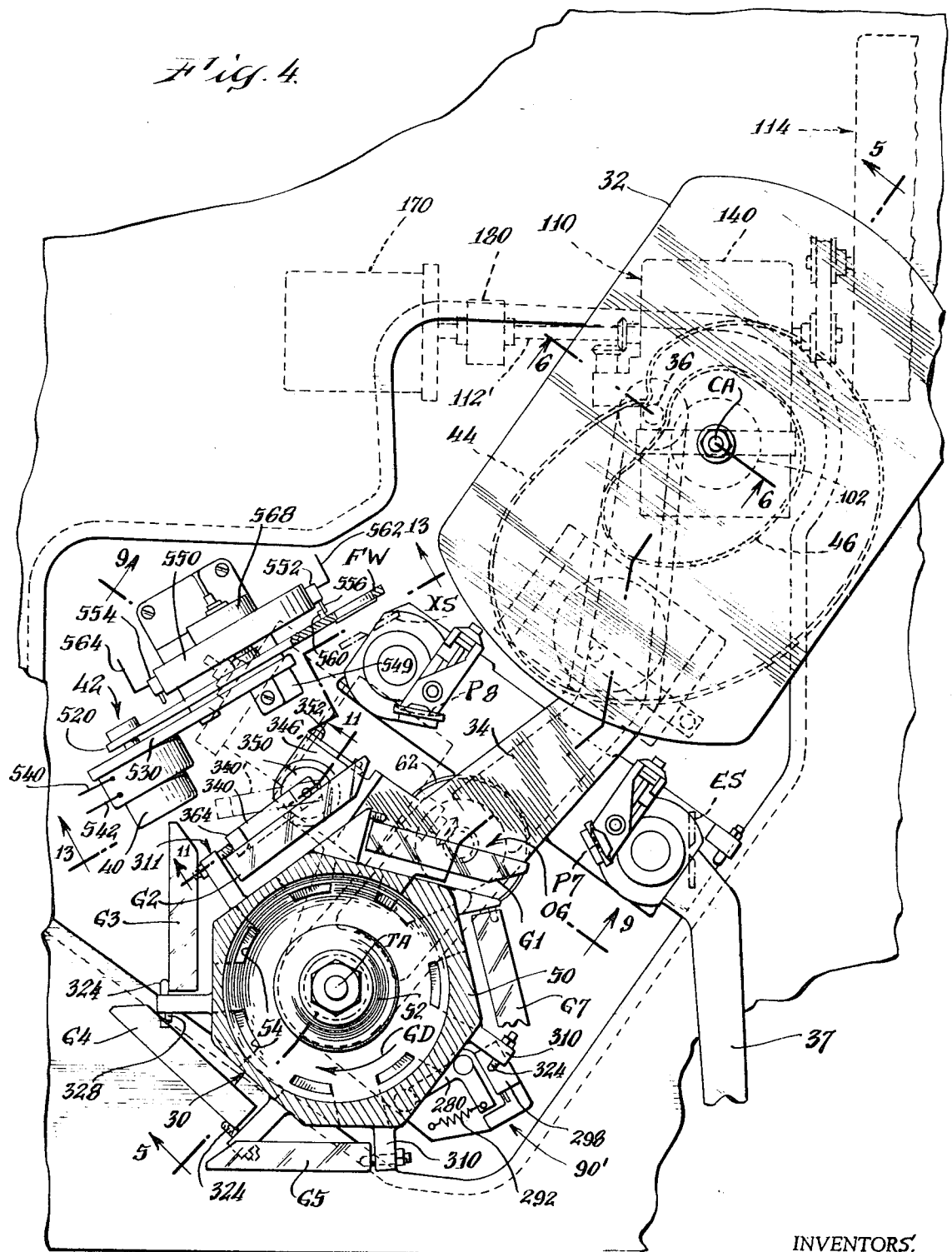

Patented May 2, 1972

INVENTORS.
John M. Roche
Rene C. Sawyer
BY
Daniel N Levinson
ATTORNEY.

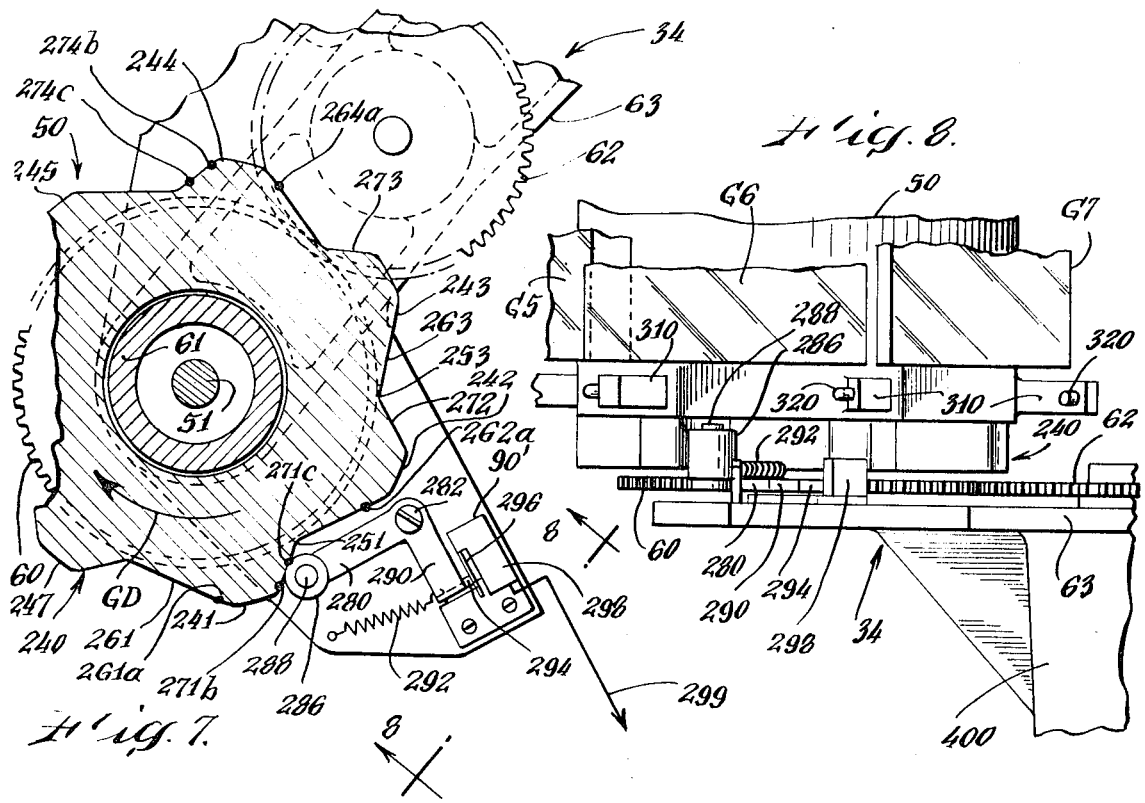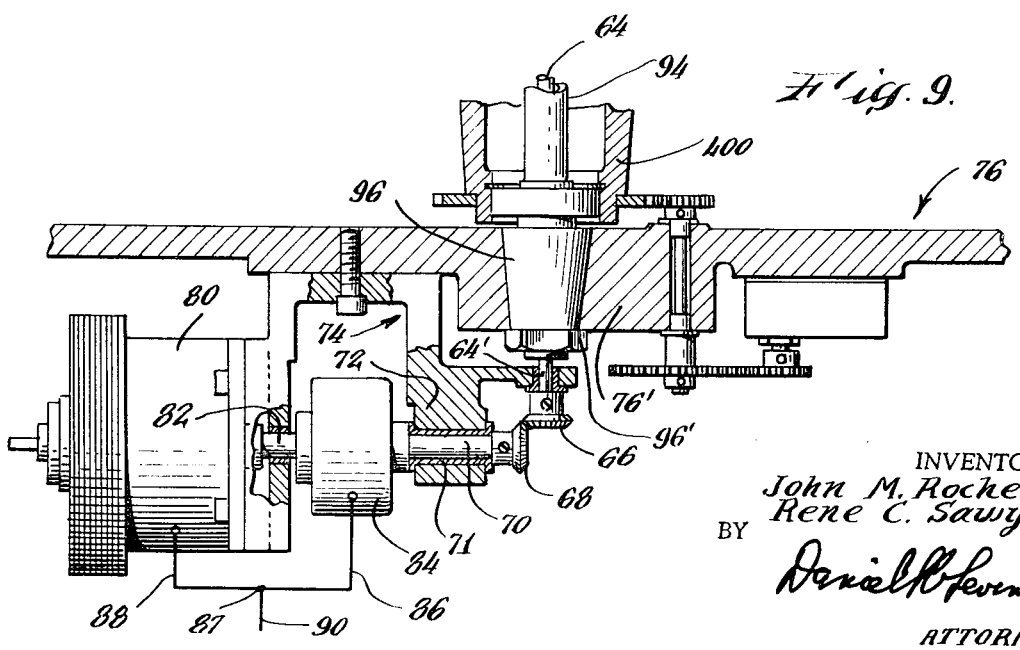

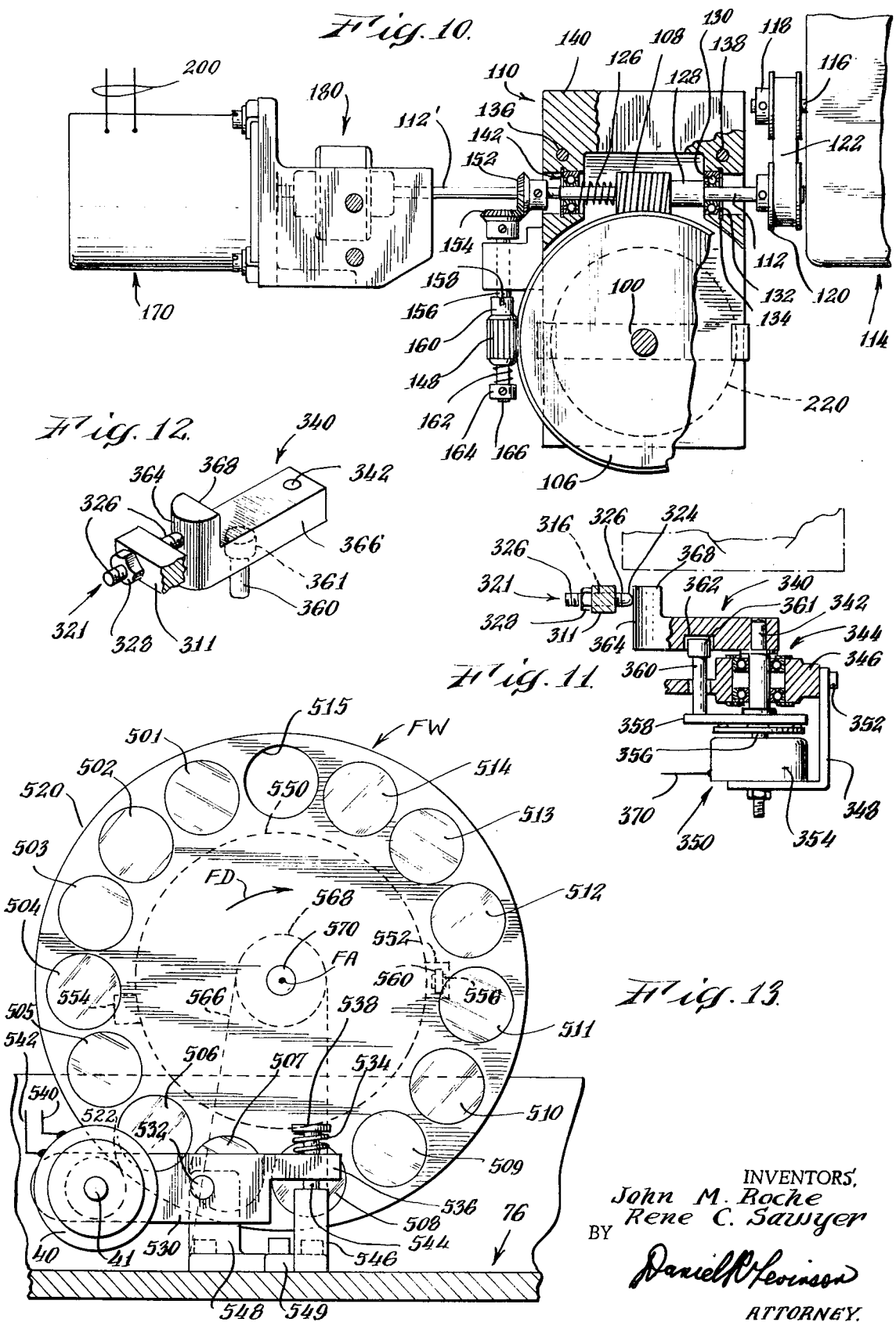

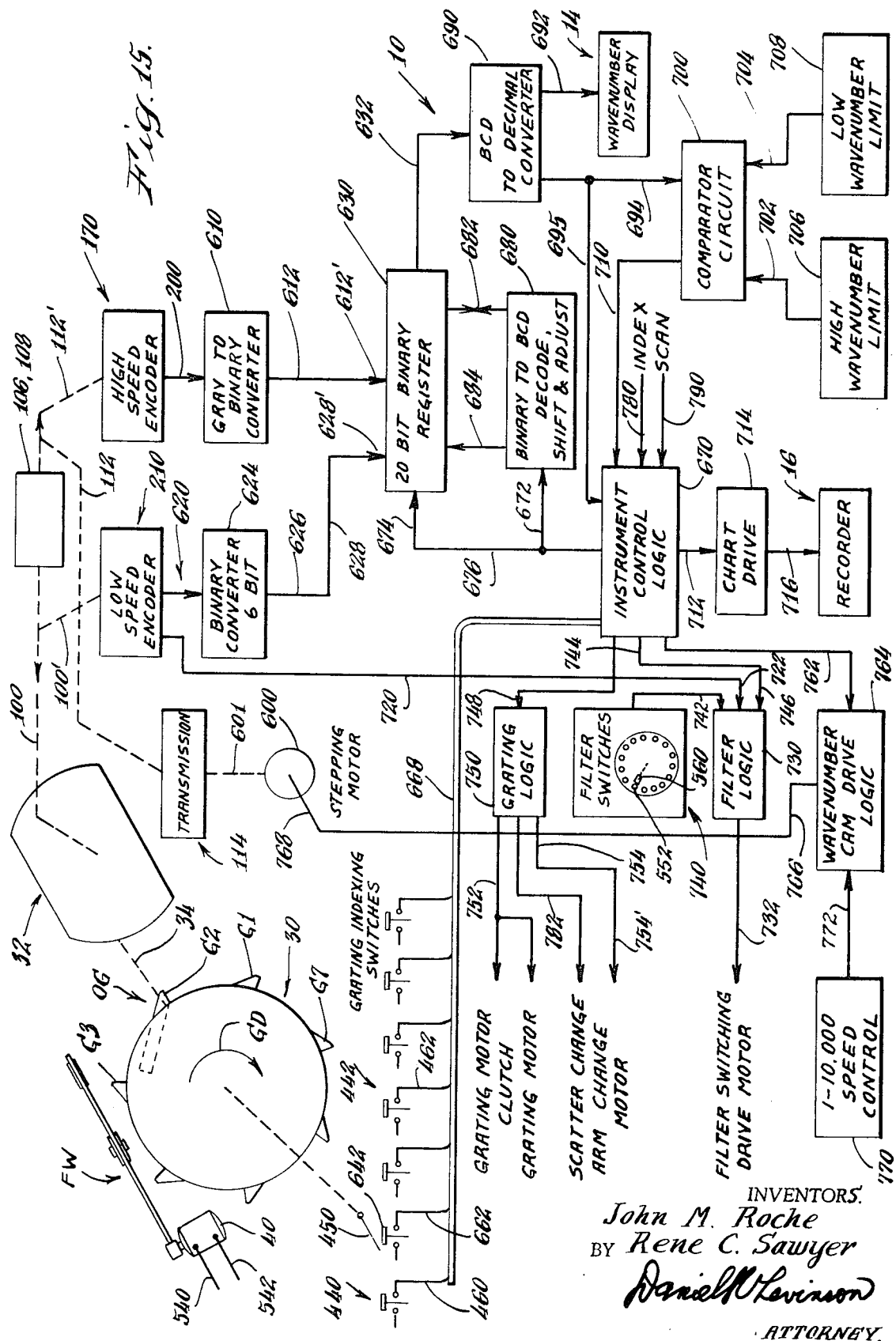

SCANNING MONOCHROMATORS

This invention relates to an automatic scanning monochromator of the type utilized, for example, in spectrophotometers. In particular the invention concerns an instrument utilizing a series of diffraction gratings as the dispersive elements, each grating being utilized over a particular part of the entire frequency (as measured for example in wavenumbers) range of the monochromator.

Generally speaking, the instrument is characterized by the fact that a relatively large plurality of gratings are utilized, so as to obtain both a long wavenumber range, with high efficiency and (optical dispersive) resolution over the entire range. In order to obtain these advantages of utilizing a relatively great number (seven in the exemplary embodiment) diffraction gratings without introducing substantial difficulty to the operator in using the instrument, another general characteristic of the inventive system is its ability to perform all of the interrelated functions required of an automatic scanning monochromator (or spectrophotometer) over such a large wavenumber range, by such interconnections and control functions as to cause each of the relatively large number of gratings to be utilized in sequence, while causing the various other parts of the monochromator to operate, change, move and the like synchronously with both the means for sequentially introducing each of the gratings to the operative position and the mechanism for slowly rotating (so as to perform the actual wavenumber scanning for each grating) that grating in such operative position. Additionally, the exemplary embodiment of the invention includes a larger plurality of filters than diffraction gratings, so as to insure that no more than one "order" of the diffracted radiation will reach the exit slit of the monochromator over the entire angular rotation of each of the gratings being individually operated. A structural characteristic of the exemplary embodiment of the invention is the utilization of a rotatable turret or "carousel," on the periphery of which the large number of gratings are mounted, so that a step-like rotation of the carousel will introduce into the operative position of the instrument any one of the gratings (and, for scanning of the complete wavenumber range, each of the gratings in turn).

In the exemplary embodiment, only a single arm or lever is utilized to rotate (about a pivot axis passing through and parallel to the linear elements of) that grating which is in the operative position. In particular, the grating carousel is itself mounted on one end of the wavenumber scanning arm in such manner that the operative grating is directly above the pivot axis of the scanning arm, and the other end of the scanning arm is drivingly connected (as by means of a conventional cam follower) to the (wavenumber scanning) cam which therefore causes the angular tilting of the operative grating about its own axis. The use of a single scanning arm or lever for all of the, say, seven gratings greatly simplifies what would otherwise be an extremely complicated structure (if each of the, say, seven gratings had its own individual scanning arm). On the other hand, a single physical (cam) element for angularly moving the scanning arm or lever is, according to one specific feature of the invention, formed so as to have two different operative cam contour surfaces, thereby allowing the single scanning arm to be angularly moved according to two different functions or " programs" without introducing any substantial additional complexity, as would be the case if two completely separate cams were utilized to provide this additional degree of operational flexibility.

One of the main characteristics of a monochromatic instrument according to the invention is the utilization of control logic for insuring the correct synchronous operation of movement (and indexing) of the grating turret, initiating the scanning arm movement and therefore the tilting of the particular grating at the operative position, movement of the auxiliary elements (which are filters in the disclosed exemplary embodiment) so as to limit the radiation reaching the exit slit of the monochromator to the particular desired (say, first) "order" of the grating, and choice of which of the two cam surfaces (both on a single structural element) is utilized to cause the rotative movement of the scanning arm that tilts the operative grating to cause the continuous change of frequency (wavenumber) of the monochromatic radiation passing through the monochromator exit slit. Another characteristic or feature of a preferred embodiment, hereinafter described in detail, is that the above-mentioned control logic is of a substantially digital nature, which in turn is controlled by a (digital) signal directly derived from the relative angular position of the grating being utilized, as by one or more digitally encoded discs directly reading the position of the (cam) mechanism driving the scanning arm. In this manner, the various operations of the instrument components (e.g., changing of gratings, changing of filters, causing of disengagement and re-engagement of the scanning arm cam follower with one or other of the two cam surfaces on the single cam element, etc.), which should occur at a particular value of the wavenumber drive, are directly controlled by a mechanism directly proportional to the wavenumber of the radiation at the exit slit of the monochromator in a precise manner (aided by both the digital nature of the control-logic and the closed-loop nature of the control system).

In order to insure high precision (i.e., reproducibility) as well as at least close approximation to absolute accuracy in the entire instrument, it is especially important that all of the mechanical elements be positioned in exactly the same manner both every time that one is interchanged for the other, and whenever the same element (e.g., grating) again becomes operative upon a subsequent usage of the instrument. For example, it is important that each of the say, seven gratings on the carousel is positioned precisely at the same operative position when it is utilized (i.e., is the grating impinged upon by the incoming "white" light which is to be dispersed). Similarly, the scanning arm must be connected to the operative grating in precisely the same manner, regardless of which grating is being utilized; in the exemplary embodiment this is accomplished by the combination of mounting the entire grating carousel on one end of the scanning arm and insuring that the operative grating is precisely "indexed" into the same "correct" position (exactly over the scanning arm pivot axis). Also the cam-follower end of the arm should precisely engage in an exactly reproducible manner whichever cam contour it is intended to follow. It is also especially important that any of the mechanical elements between the ultimate prime movers (e.g., motors) and the elements being moved thereby (and especially the cam which controls the scanning arm and therefore the grating angular position) be as free of any mechanical imprecision or "looseness" (e.g., backlash) as is practical to obtain, if the instrument is to substantially obtain its practical limit of resolution (and maintain precision in wavenumber readout).

To obtain the desired degree of "fineness" in the wavenumber readout, preferably both a relatively coarse and a quite "fine" readout is obtained of the effective position of the cam (which is of course a known function of the position of the scanning arm which in turn is proportional to the position of the grating) and therefore of the exact wavenumber. In particular a pair of, preferably digital, angular (shaft) encoders are utilized on opposite sides of a substantial speed-reduction means (e.g., a conventional worm and worm wheel or gear train), so that the encoder on the slow-moving side of the speed reduction may give a signal indicative of the first few (say, less than two in decimal form or, say, five or six in binary digital form) significant figures, while the "fine" encoder on the fast-moving side of the speed reduction means may give the lower or "less significant" places (say, three in decimal form or at least about nine or 10 in binary digital form) so as to provide the fine readout data. In conventional decimal Arabic form, for example, the slow moving encoder could provide, say, the thousand and hundred unit Arabic numeral figures; while the rapidly moving encoder (which could in theory even be directly connected to the driving motor shaft) could provide the tens, units and the first place to the right of the decimal point (i.e., tenths) in Arabic numerals, where the instrument is intended to read out directly in wavenumbers (e.g., over the range of from 4,000 to 33 wavenumbers in the infrared region (this being equivalent to 2.5 through 300 microns in wavelength). In this manner extreme precision, e.g., to four whole numbers and one decimal place (i.e., tenths) in decimal form, may be obtained without imposing impractically high "resolution" requirements from a single encoder or other (digital) readout device.

The utilization of a completely digital control system, and especially one of a "closed-loop" type, yields not only precise control of the entire instrument almost "by itself", but also yields secondary advantages. Among these, are the ability of the instrument to be readily "commanded" to set itself to any particular wavenumber and to then scan to any other particular wavenumber (both of course being within its entire scanning range capability), or to perform more complex "programmed" spectroscopic scanning. For example, an instrument according to the invention is readily adaptable to being "programmed" to scan a particular interval (say, from 2,000 to 500 wavenumbers), to determine therefrom wherever large, say, absorption peaks occur (assuming the instrument to be an absorption type of infrared spectrophotometer), and then to return to the spectral interval immediately surrounding such significant "peaks" (which typically appear as valleys in an absorption spectrogram) and rescan under more stringent requirements (e.g., a slower scanning rate, higher gain, and ordinate expansion), so as to effectively eliminate the finite response times of for example the recording pen and other mechanical parts and the limited ordinate range from limiting the observable "detail" (in a, say, pen drawn spectrogram).

The availability of a (digital) signal precisely measuring the wavenumber has the further advantage that this signal may directly drive the abscissa mechanism of, for example, a chart recorder. As will be noted hereinafter, one of the primary readouts of the instrument typically would comprise a chart-type recorder. As is well known in the, say, spectrophotometer art, such chart recorders are connected to the instrument in such a manner that the abscissa movement of a pen relative to either a moving continuous strip or a stationary chart is intended to be directly proportional to the, say, wavenumber of the monochromatic radiation being utilized at each point during the spectral scanning by the monochromator. The availability of a (digital) electrical signal precisely equal to the wavenumber during all times of the entire spectral scanning range assures that the abscissa (wavenumber) values recorded are correct (i.e., eliminates any accumulative errors and imprecision due to slippage or the like). Additionally, the digital nature of the wavenumber readout (which itself is utilized as one of the main inputs to the control logic of the instrument) also greatly facilitates utilization of existing digital data-processing apparatus as either the main or auxiliary readout of the output of the, say, infrared spectrophotometer of which the automatic scanning monochromator of the invention may form a major part.

An object of the invention is the provision of an automatic scanning monochromator system, of the type utilized for example in spectrophotometers, which exhibits extremely high resolution and great precision over a very large spectral range (as measured, for example, in wavenumbers).

A related object of the invention is the provision of such a high precision, high resolution automatic scanning monochromator, the dispersive assembly of which exhibits relatively high, substantially constant efficiency in presenting to the exit slit of the monochromator the changing substantially monochromatic radiation without either large or greatly varying losses in the intensity of such dispersed and separated monochromatic radiation.

A related object of the invention is the provision of such a high resolution, high precision automatic scanning monochromator over a very large spectral range, for example one in which the lowest and highest wavenumber (or wavelength unit) varies by at least about a factor of 100 from each other, or expressed in different terms at least about seven "octaves" (i.e., 2 to the 7th power).

A more specific related object of the invention is the provision of such an extremely large spectral range, automatic scanning monochromator utilizing a relatively large plurality (that is, more than two and in particular, say, seven) of diffraction gratings as the main dispersive elements, in which at least most of the gratings are utilized only over approximately one "octave" or "order", thereby maintaining substantially constant both the resolution and the relative efficiency of the monochromator over this extremely large spectral range.

A related object is the provision of such a "multi-grating" (i.e., more than two gratings) automatic scanning monochromator in which there is operatively associated with each of the different gratings at least one secondary spectrally active element for insuring that the radiation diffracted by the grating that reaches the exit slit of the monochromator is limited to one "order" of the grating.

A more specific related object is the provision of such a multi-grating automatic scanning monochromator in which a plurality of filters are utilized as the means for insuring that only a single order of diffracted radiation reaches the exit slit, and even more particularly in which there are more filters than gratings, so as to insure complete isolation of the desired "order" of each grating without substantially diminishing the intensity of the dispersed (desired order) radiation over the entire spectral interval that each grating is utilized (e.g., one "octave" of wavenumbers).

Another major object of the invention is the provision of a high resolution, high precision automatic scanning monochromator which utilizes a relatively large plurality of dispersive elements so as to allow a large spectral range of use, in which the system for changing such dispersive elements is of the "closed-loop" type.

A related object of the invention is the provision of such a "closed-loop" controlled automatic scanning monochromator having both a series of primary and a secondary series of secondary spectrally active elements, in which the effective (angular) position of the major dispersive element (e.g., grating) being utilized (which position is therefore a known function of, e.g., the wavenumber of the radiation appearing at the exit slit of the monochromator) controls sequential changing of both the primary and the secondary spectrally active elements.

A more specific related object of the invention is the provision of such an automatic scanning monochromator having a relatively large plurality of dispersive elements, in which the (angular) position of the particular dispersive element being utilized (and therefore the wavenumber of radiation at the exit slit) is determined by means of digital techniques, and the resulting signal is utilized not only for wavenumber readout but also for control of the interchange of the dispersive elements and related functions of the instrument, including, also for example, control of the readout device (e.g., the abscissa drive of a chart recorder).

A closely related object is the provision of such a multi-dispersive element, automatic scanning monochromator in which the means for varying the (angular) position of the operative dispersive element is provided with at least one digitally reading encoder, which in turn provides the major input to the control system logic, as well as the wavenumber readout.

A more specific related object is the provision of such a multi-dispersive element, automatic scanning monochromator in which the ultimate means for moving (angularly) the particular dispersive element being utilized includes a speed reduction means; and a digital encoder is positioned on each side of said speed reduction means, thereby obtaining both a coarse and a fine wavenumber readout signal, which combined give a highly precise (e.g., five decimal "bits") wavenumber indication over a very large range of wavenumbers (e.g., more than 100 to 1) without requiring more than reasonably obtainable "resolution" from each of the two digital encoder readouts.

A somewhat different object of the invention is the provision of an automatic scanning monochromator utilizing a relatively large plurality of dispersive elements, a single actuating or scanning arm for the dispersive element which is in use at any given time, and a single physical cam means for causing motion of said arm according to a desired function, thereby simplifying the means for moving each of the large plurality of dispersive elements.

A closely related object of the invention is the provision of such multi-dispersive elements, automatic scanning monochromator utilizing only a single scanning arm and a single cam means, which cam means however includes two different (rigidly attached) cam contour surfaces, whereby a single substantially integral cam element can provide two different (although related) movement functions or programs for the same scanning arm, so that at least one of the dispersive elements may be moved (e.g., rotated) according to the program of one of said cam contours while at least one of the dispersive elements may be moved according to the other of said cam contours, thereby increasing the versatility of the scanning "program" of the various dispersive elements without introducing any substantial additional mechanical complexity.

Other subsidiary objects of the invention include the provision of all the necessary precise devices and interconnections to insure that the multi-dispersive elements automatic scanning monochromator has extremely high reproducibility and at least high (absolute) accuracy, for example, by insuring that each of the dispersive elements is "indexed" into substantially exactly the same operative position when it is to be used, by insuring against any undesirable slippage, play, or backlash in any of the mechanical connections between the various elements, and by utilizing digital type control logic (which by its nature is not subject to drift or other randomly variable errors) to control all of the precise parts of the monochromator.

Other objects, features and advantages of an automatic scanning monochromator according to the invention will become obvious to one skilled in the art upon reading the following detailed description of a single preferred embodiment of the invention in a typical environment (e.g., spectrophotometer), in conjunction with the accompanying drawings, in which:

FIG. 3 is an optical schematic view of a plan-view nature of an entire spectrophotometer system, embodying an automatic scanning monochromator according to the invention;

FIG. 4 is a plan view, with some parts broken away, on a relatively enlarged scale of, generally, the left-hand half of the mechanical components shown in FIG. 2, which include the main mechanical parts for interchangeably carrying the dispersive elements (specifically a series of seven diffraction gratings and a larger plurality of order-separating filters);

Figures 5, 6, 14:
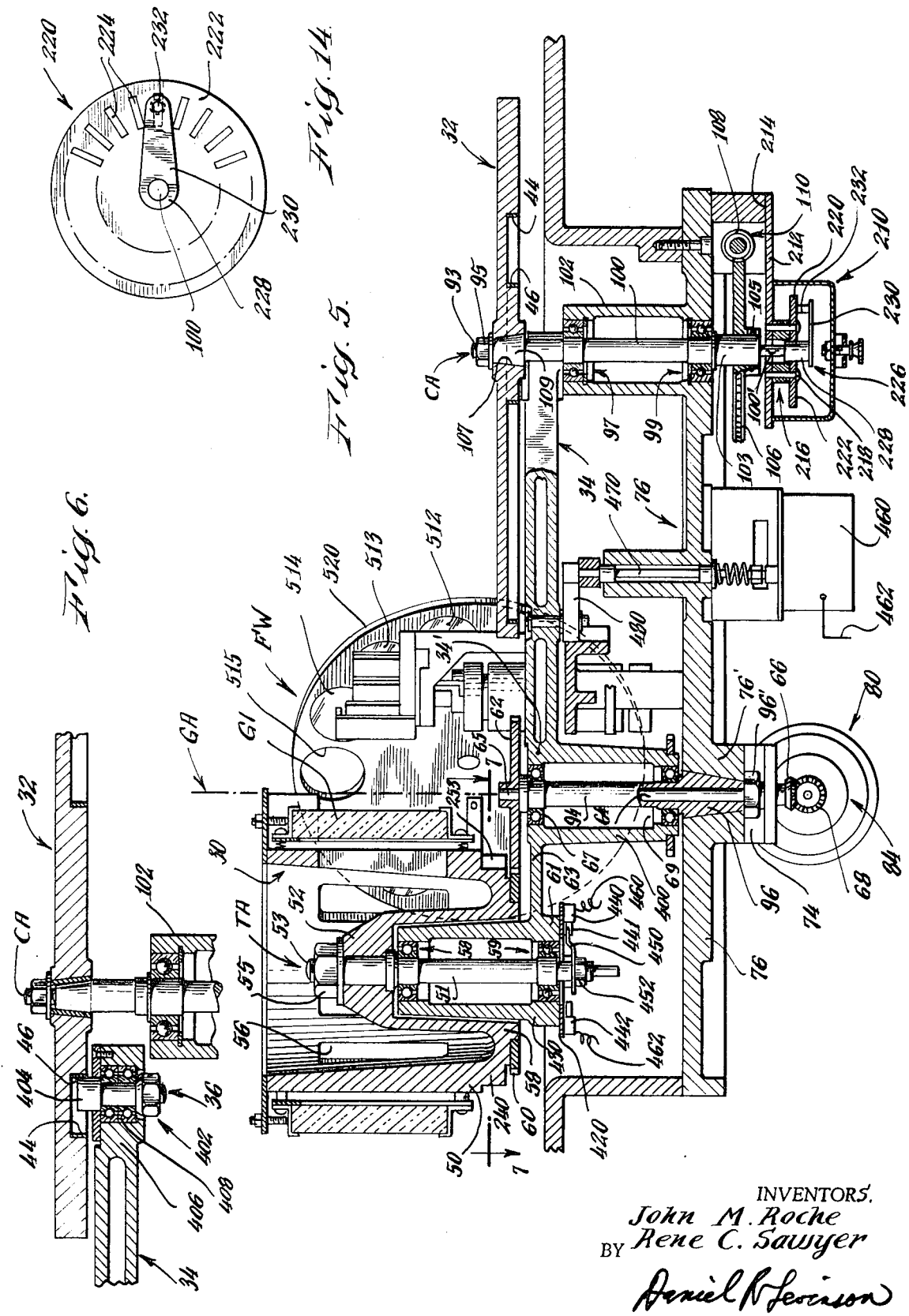

FIG. 5 is a vertical section, taken on the line 5—5 in FIG. 4, which section passes substantially through the central axes of both the grating-supporting "carousel" and the main scanning (wavenumber) cam element, showing also the scanning lever or arm connecting the entire carousel and therefore the operative grating to said cam, as well as various mechanical parts which are not seen in FIG. 4 since they are below obscuring plates or other elements;

FIG. 6 is a vertical section taken on the line 6—6 in FIG. 4, showing in detail how the main cam element is engaged by the cam follower end of the scanning lever arm;

FIG. 7 is a horizontal view taken on the line 7—7 of FIG. 5, showing the spring-loaded toggle lever and the (seven-lobe) cam-like element rigidly attached to the grating carousel for insuring that the carousel is biased or indexed to one of the (seven) particular positions in which a grating is in its operative position, as well as controlling the motive power (specifically, a motor and electrically actuated clutch) which drives the grating carousel from the existing one of its (seven) positions to typically the next one (but in general to any) of its other positions;

FIG. 8 is an elevational view, looking in the direction of the line 8—8 in FIG. 7, showing both this spring-loaded follower-like toggle indexing lever and part of the means for driving the carousel to each of the plurality (i.e., seven) positions in which a different grating is placed in operative relationship in the radiation beam intended to be dispersed;

FIG. 9 is a vertical section taken on the line 9—9 in FIG. 4 showing part of the motive means for driving the carousel to each of said discrete multiple positions corresponding to positioning a particular grating in such operative position;

FIG. 10 is a detail horizontal view of the parts, shown near the top of FIG. 4, for precisely driving the cam plate (not shown in FIG. 10 but shown in FIGS. 4 and 5) so as to cause the main scanning cam element (see FIG. 4) to be rotated in a precise manner at a given angular speed, without any backlash relative to the driving assembly therefor and the ("fine" digital) readout (shown at the left in FIGS. 10 and 4) thereof;

FIG. 11 is a vertical section taken on the lines 11—11 in FIG. 4, showing the manner in which the particular (of seven) stop elements (one associated with each of the gratings on the carousel) is precisely stopped in the desired position so as to cause exactly precise positional indexing of the particular grating that is in its operative position in the radiation beam;

FIG. 12 is a detailed perspective view of FIG. 11, showing how the movable blocking means for each of said stop elements has an operative blocking surface concentric with its pivot, so as to insure that each of the stop elements is positioned (in space) at exactly the same precise desired (linear) position whenever the blocking element is operative, even if the blocking element itself is not precisely in the same (angular) position every time it engages one of the stop elements;

FIG. 13 is an elevational view taken on the lines 13—13 in FIG. 4 showing the filter wheel (holding 14 filters and one additional open space for test in the exemplary embodiment) which acts as the auxiliary spectrally active means (i.e., grating "order" separating means in the specific embodiment of the invention), along with the means for incrementally moving the filter wheel so as to position a particular desired filter in the radiation beam diffracted from the grating (see the optical schematic of FIG. 3);

FIG. 14 is a somewhat schematically shown detail view of the low-speed encoder, connected to the lower end of the cam assembly, as seen generally looking upwardly at the encoder from its position in the lower right-hand corner of FIG. 5; and FIG. 15 is a diagrammatic representation of the entire monochromator, showing a few of the mechanical elements and showing substantially all of the electrical and electronic elements, in schematic or block diagram form.

GENERAL DETAILED DESCRIPTION

Figure 1:
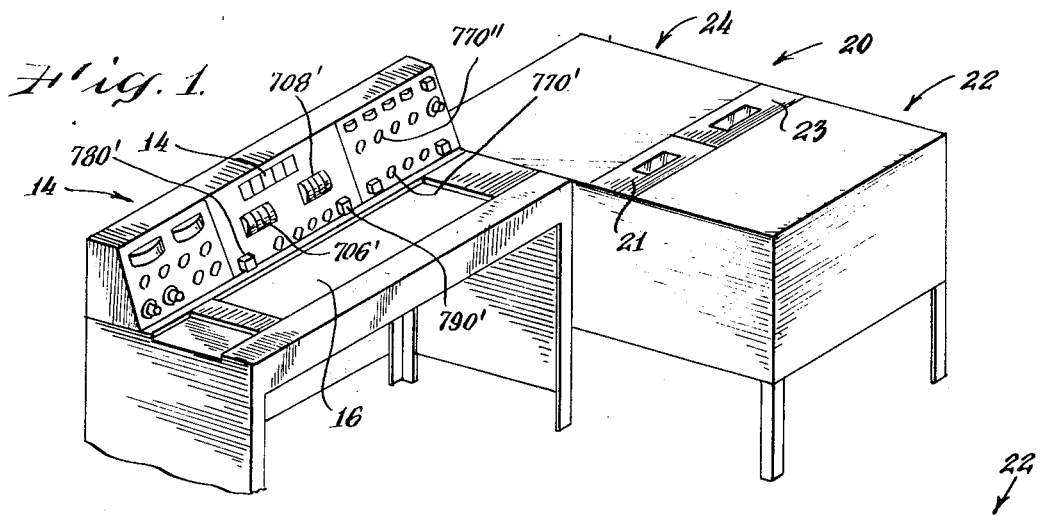
FIG. 1 is a partially diagrammatic perspective view of an exemplary instrument (e.g., a spectrophotometer), in which an automatic scanning monochromator according to the invention may be utilized.

FIG. 1 shows in perspective in somewhat generalized form a specific exemplary instrument (for example an infrared recording spectrophotometer) in which the automatic scanning monochromator of the invention may be utilized. In this figure, two major, somewhat separate units are shown; the first of these units at 10 is a console which includes both most of the operator-controlled settings for the various parameters of the instrument, its readouts, including for example a plurality of conventional needle-type (i.e., analog) meters; a main (decimal system) digital, visually readable, wavenumber readout 14; and a two-dimensional chart recorder, generally shown at 16. The chart recorder may be of the dual-mode type, an example of which is more completely described, shown and claimed in U.S. Pat. No. 3,380,065 issued to Alpert et al. and assigned to the assignee of the instant application; and, more particularly, it may include the features of the differential cable type chart recorder fully described, shown and claimed in U.S. Pat. No. 3,396,402 issued to Charles deMey II, and also assigned to the assignee of the instant application. Since the details of many of the control functions and most of the readout devices form no part of the present application, little of the details of the elements on and in console unit 10 are described in the instant specification (except as to explain its operation near the end of the specification in conjunction with the diagrammatic control block diagrams of FIG. 15).

The main optical, mechanical and the majority of the electromechanical parts of the instrument may be contained in a separate unit, hereafter sometimes referred to as the main or table unit, generally shown at 20 in FIG. 1. Generally speaking the right-hand or foreground part of this unit at 22 will include the source (or sources) of radiant energy and the optics and other elements associated therewith, so as to form a pair of time-spaced but otherwise substantially identical radiation beams (hereinafter referred to as the sample and reference beams), passing through sample and reference compartments 21,23 (indicated as having housings or covers having cut-outs), which may or may not actually exist in the preferred embodiment of a spectrophotometer or other optical instrument utilizing the monochromator of the invention. Each of the two separate (and time-spaced) radiation beams will then enter the main monochromator portion of the instrument 24 after passing through a sample and reference cell assembly (see FIG. 2 at 26,28).

Figure 2:
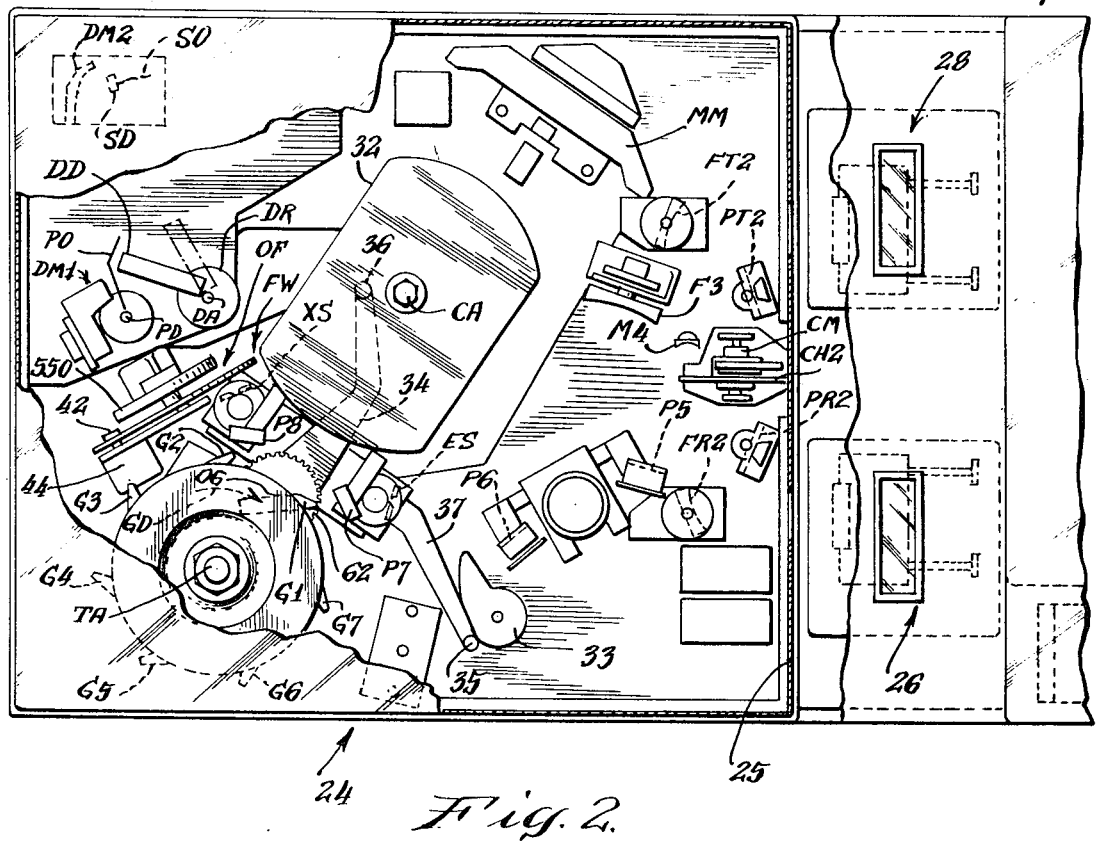
FIG. 2 is a partially diagrammatic plan view of that part of the exemplary instrument shown in FIG. 1, generally comprising the left-hand two-thirds of the right-hand unit thereof, which portion contains the major mechanical components of an exemplary embodiment of an automatic scanning monochromator according to the invention.

The main monochromator portion or system 24 is generally shown in FIG. 2, and will be described generally in conjunction with this figure. However, for purposes of completeness of explaining an exemplary use of the invention, the general optical functioning of the exemplary double-beam (absorption) spectrophotometer (and, in particular, an infrared absorption spectrophotometer) will first be described, merely for background purposes, relative to the optical schematic of FIG. 3.

In FIG. 3 a pair of radiant energy sources S1 and S2 are shown near the upper right-hand corner; the reason for showing two sources is merely to indicate, as will generally be true in a preferred embodiment of the invention, that more than one type of infrared source may be required, since the efficient operation of most infrared sources is limited to a special interval or range less than the entire spectral range of the exemplary monochromator (and therefore the exemplary spectrophotometer in which it is incorporated). Thus S1 may be considered as a "near" and moderately "far" infrared source, utilized from, say, 2.5 microns to 100 microns (i.e., 4,000 wavenumbers down to 100 cm.$^{-1}$) while a second source S2 may be utilized at the relatively long infrared part of the large spectral range of the instrument, for example, from 100 to, say, 300 microns (that is, from 100 to 33 wavenumbers). The illustration of two such sources in FIG. 3 is primarily to emphasize that an automatic scanning monochromator according to the invention is capable of such a large spectral range that it may practically require two different types of sources in order to provide a reasonable quantity (intensity) of radiation at both the upper and lower parts of its spectral range.

For exemplary purposes, it will be assumed that the lower source S1 is utilized first for the relatively shorter wavelength (e.g., 2.5 microns and up, or 4,000 wavenumbers and down; while the upper source S2 is used subsequently); obviously the converse relationship may be used instead. In any case it will be assumed for purposes of concreteness of explanation that the two-position (say, pivotable) first collecting or condensing element (exemplified by a concave mirror) C1 is in its full line position so as to cause the radiation from source S1 to be reflected along the path of the first or main radiation beam R1. Obviously when the collecting or condensing mirror C1 is in its other position (as indicated by the dotted-line position in FIG. 3) and the other source (S2) is energized, then the radiation from this source will be converged along the same main radiation beam path R1. In any event, in the exemplary optical system a first (preferably front surface) plane mirror P1 will reflect the converging energy until it reaches the conjugate image of the source (relative to C1) at I1. In the exemplary system (as shown), the object plane (S1, S2) of the mirror C1 and its conjugate image plane (at I1) may be at an object to image distance ratio of 2:1, so that the source image at I1 will be magnified by a factor of 2 relative to the original source (S1 or S2). Rays emanating from this source image I1 will be reconverged or focussed by a focussing mirror F1, so that after reflection from a (preferably front-surface) second plane mirror P2, the rays will be focussed to a second image I2, say, at (or at least closely adjacent) the small (front-surface) toroidal field mirror M3. The radiation will then impinge upon a chopper CH1, comprising, for example, a rigidly attached rotating shaft RS1 and a chopping disc CD1, a portion of the latter of which is directly in the beam emanating from I2.

As is well known, such a chopper disc CD1 may comprise a plurality of transparent (e.g., open) sector-shaped portions, peripherially separated by highly reflective, generally sector-shaped portions; in this manner the original radiation beam R2 emanating from the source image I2 is alternately caused to appear as a transmitted radiation beam TR and a reflected radiation beam RR. One of these beams (TR or RR) will act as the sample-transversing beam, while the other will act as the reference-transversing beam in a manner well understood in the double-beam optical testing (e.g., spectrophotometer) art. In the particular exemplary embodiment shown, each of the transmitted and reflected beams (by the chopper) is reflected by a further (front surface) plane reflector PT and PR respectively, so as to be deflected to a converging or focussing mirror FT and FR respectively, each which refocusses its respective beam TR1 and RR1, respectively, to a further image of the source IT and IR, respectively, in the vicinity of the sample and reference cells (at 26,28, not necessarily respectively). Each of the beams emanating from these respective images (IT and IR) at TR2 and RR2 will then be converged or focussed by its respective concave focussing mirror FT2, FR2, so as to form a converging further transmitted and reflected beam TR3 and RR3, respectively. After each of these beams has been reflected by its corresponding further (front-surface) plane mirror PT2 and PR2, the respective deflected beams TR4 and RR4 will cross the path of a recombining or second main chopper CH2, comprising a second chopping disc CD2. This chopping disc will typically consist of one or more transparent, generally sector-shaped portions, alternating with reflective portions. For this reason, part of the time, the radiation originally transmitted by the first chopping disc (CD1) at TR4 will be reflected by a reflecting surface of the second chopper disc CD2 so as to converge to a further image of the light source at I4, while, during the remainder of the time, the beam RR4 (which was originally reflected by a reflecting portion of the first chopping disc CD1) will be transmitted through a transparent portion of the second chopping disc CD2 to this same point I4.

Although there are many well-known techniques for causing an original source beam, as at R1, to be time-chopped into two separate beams as at TR and at RR, respectively, and then to be recombined by a second chopper (as at CH2, CD2) preferably the two choppers (CH1 and CH2) and in particular the two chopping discs CD1 and CD2 are in the phase relationships fully disclosed and described in already published British Pat. No. 1,157,086 published on July 2, 1969, in the name of Perkin-Elmer Limited, (Beaconsfield, Buckinghamshire, England), of which the individual inventor was Michael A. Ford, the corresponding U.S. application having been filed under Ser. No. 571,279 on Aug. 9, 1966 and now U.S. Pat. No. 3,542,480. Regardless of the exact chopping scheme or "photometric system" utilized, ultimately at point I4 there will appear, in time-spaced sequence, radiation which has traversed one path through point IT and radiation which has traversed a different path including point IR (so that one of the beams has passed through the sample while the other has passed through the reference). Again, it is relatively immaterial as to which of the two beams is considered the "sample" beam and which is considered the "reference" beam, except that, of course, it is the beam passing through the sample that is attenuated by absorption by the sample (in an absorption spectrophotometer) so that the "sample" beam is of lower amplitude than the "reference" beam, at least at those wavenumbers (or spectral bands) at which the particular sample being analyzed has substantial absorption. As is well known in all types of double-beam absorption optical instruments (e.g., spectrophotometers), some technique is therefore required (whether utilizing an optical attenuator in the reference path, or electronic signal processing), e.g., forming a ratio of the amplitudes of the intensity of the time-spaced radiation beams transmitted by the sample and by the reference respectively, the relative intensity of the beams at, for example, TR4 and RR4 will be ultimately compared and measured.

In a scanning spectrophotometer this is done at each of a continuously varying spectral line (in theory) or very narrow spectral interval (in practice) over some spectral range. For this purpose, a scanning monochromator, which sequentially presents to a radiation detector, in time-spaced relationship, beams at least proportional to the intensity of beams TR4 and RR4 is required. In an actual spectrophotometer being readied for commercial sale, generally corresponding to the exemplary embodiment herein illustrated, the scanning monochromator is positioned beyond the recombining chopper CH2 as shown in FIG. 3, so that "white" radiation goes through both the sample and the reference. As is well known in the art, the monochromator may be positioned instead in the single beam prior to splitting by the first chopper CH1, so that only monochromatic light goes through the sample and reference at any given time instead. In other words, in the preferred illustrated embodiment the source radiation is first broken into a pair of time-spaced beams, one of which is sent through the sample and one of which bypasses the sample, followed by recombining of these beams, and then ultimately "scanning" these recombined beams by a variable monochromator so as to measure continuously their relative intensities at discrete narrow intervals over a long spectral range; however, it is at least theoretically just as practical to place the monochromator somewhere in the vicinity of I1 in FIG. 3 instead without affecting the theoretical operation of the instrument. Therefore none of the details of the particular source optics, exact optical elements, and even the preferred chopping techniques (as disclosed in the above-mentioned British Pat. No. 1,157,086 and U.S. application) are either critical or closely related to the inventive features herein claimed which relate to the monochromator and its immediate environment; and even the relative position of the scanning monochromator in the instrument is neither essential nor particularly important to the invention. Indeed, one may consider all of the so-far described elements as not especially pertinent to the invention, but merely as exemplary components of an instrument, namely, an absorption spectrophotometer, forming one of the major uses or combinations in which the automatic scanning monochromator of the invention may be utilized.

The recombined radiation reaching (image) point I4 will be reflected, in the exemplary embodiment, by a (preferably front-surface) toroidal field mirror M4, thereby forming the combined, time-spaced beam CB. Although the next component C5 impinged upon by this beam CB is shown schematically as a pair of (rigidly attached to a single pivot) interchangeable elements, it will suffice for present purposes to assume that the particular element met by beam CB is a further (preferably front-surface) plane mirror P5, which reflects the beam to a further converging or focussing mirror F3; so that the beam reflected by this concave mirror is a converging combined beam CC. Again temporarily assuming that the interchangeably mounted two-element component C6 (similar to C5) next encountered by the beam has its (preferably front-surface) plane mirror P6 in the path of beam CC, the converging combined beam will merely continue to converge after deflection as beam CC1. This beam (CC1) will ultimately converge to an image preferably of relatively long(in the direction perpendicular to the plane of the paper) and narrow (in the generally vertical direction in FIG. 3) further image I5 of the source.

As is well understood by those skilled in the optical arts in general and in the spectroscopic instrument art in particular, the various concave mirrors or other converging elements (e.g., C1, F1, identical elements FT and FR, similarly matched elements FT2 and FR2, and element F3) are all preferably chosen so as to perform their desired function not only in an efficient manner but also so as to avoid (to the extent practical) any optical aberrations. In particular, most of these mirrors are not simple spherical mirrors, but in general are toroids, since it is assumed that the source (or sources) S1 (and S2) are relatively elongated in the direction perpendicular to the plane of the paper in FIG. 3 while they are relatively narrow or thin (i.e., point-like in two-dimensions) in cross-section (as seen in the plane of FIG. 3). Depending on the exact geometry of the radiation axes entering and leaving these various concave mirrors (or other converging optical elements) some or all may be off-axis toroids (for example, at C1), depending on the exact optical design of the system. Again, the exact details of the optics to the right of point I5 in FIG. 3 do not necessarily form any part of the invention herein claimed.

The radiation emanating from this last-mentioned point I5 will typically be restricted by a pair of monochromatic entrance slits Es, variable in "width" (i.e., the generally vertical direction in FIG. 3), as is well known in the art; and the radiation will enter the monochromator i.e., the elements effectively to the left of entrance slits ES in FIG. 3) as a (variably) restricted-in-width entrance beam EB. This (diverging from point I5) entering beam EB may be reflected by a further (front-surface) plane mirror P7, so as to form a reflected entering beam RE, heading in the general direction toward the main collimating and focussing mirror of the monochromator MM. This monochromator mirror (MM) is preferably of such positive converging power (i.e., focal length) that its "object" I5 is in its first principal plane; therefore the reflected entering beam RE upon impinging (on the generally right-hand half in FIG. 3) of the monochromator mirror will be collimated thereby as reflected collimated beam RC. This collimated beam RC will then be incident upon that one of the diffraction gratings which is in the "operative" grating position, namely, OG.

As is well understood in the spectroscopic art, a diffraction grating (for example, those of the reflection type, as utilized in the exemplary embodiment) will disperse incident "white" radiation into its component spectral parts by diffracting each spectral component (i.e., each spectral line or narrow spectral interval) by a different diffraction angle. In particular, assuming (as in the exemplary embodiment) that the incident radiation is collimated (i.e., made up of mutually parallel rays), then, for a particular "order" (say, the first order), a (plane reflective type) diffraction grating will cause the radiation to be dispersed as a (theoretically infinite) series of parallel or collimated beams, each of which exhibits a different diffraction angle (as measured between the normal to the grating surface and the direction that each of such parallel beams leaves the grating). Thus for a particular angular setting of the grating, which is pivotable about its active diffraction surface about a line parallel to the linear elements of the diffraction grating, schematically indicated as the grating (pivot) axis GA in FIG. 3, one particular substantially monochromatic parallel or collimated beam MC (containing only radiation at a single or very narrow interval of wavenumbers) will leave the diffraction grating at the particular exemplary diffraction angle indicated by this beam. Obviously there will be (a theoretically infinite) set of other monochromatic parallel beams of different wavenumbers leaving at different diffraction angles (not shown). The particular monochromatic collimated beam MC illustrated is the one that leaves the grating at such a diffraction angle as to ultimately reach and pass through the exit slits (XS) of the monochromator (after having been refocussed by the main monochromator mirror MM as a converging or focussing monochromatic beam FM and being reflected from a further auxiliary plane mirror P8 as a reflected monochromatic beam RM).

If a diffraction grating (and in particular the one in the operative position at OG only diffracted radiation at a single, say the first, "order" and the exit slits XS are relatively narrow, then only radiation at a substantially single wavenumber (or, practically speaking, a very narrow interval) would pass through the exit slit. Unfortunately however, real diffraction gratings, even though "blazed" so as to be especially efficient only over a relatively small angle or wavenumber range (so as to be relatively efficient in a particular, say, first order) so that much of the diffracted radiation is concentrated in the desired particular "order," nevertheless generate other "orders" of diffracted radiation, and one or more of (different "harmonics" or "orders" of wavenumber) of such different (say, second or third) order diffracted radiation will also follow the same path as the desired monochromatic radiation (MC, FM, and RM). Therefore some means is required to separate out such different order (of entirely different wavenumber or wavelength) radiation either prior to or subsequent to the exit slit XS. In the exemplary embodiment, a series of filters, carried by a filter wheel FW, are utilized for this purpose. Preferably more filters than gratings (G1, G2, G3, etc. in FIG. 3) are provided, so as to insure that the spectral bandpass of each filter (which necessarily must be no greater than the entire spectral range over which a particular single grating is utilized) is at least somewhat larger than the part of the spectral range of a particular grating with which the particular operative filter OF at any given time is utilized. This insures that the filters do not substantially attenuate any radiation within said part of said spectral range of the particular grating with which it is utilized, while the filters still act as highly effective "order-separators." In the exemplary embodiment (as will appear hereinafter) two filters are utilized for each grating (so that for an instrument having seven diffraction gratings, 14 "order-separating" filters would be utilized). The filter wheel FW will of course be rotated about its axis, schematically illustrated at FA in FIG. 3 in a step-like manner so as to advance a different filter into the operative position OF as required (every time a new grating is positioned at OG and every time such operative grating is rotated to approximately the mid-point (as measured in wavenumbers) of its useful range, respectively. Because of the "order-separating" properties of these relatively narrow spectral bandpass filters, the "wrong" order radiation or harmonics of the desired wavenumber is essentially completely "blocked" or removed by the particular filter at OF; therefore the radiation beam beyond the filter wheel is "-monochromatic" (i.e., contains the radiation over only a very small spectral interval and no other), so that this beam may be considered "truly monochromatic," and is identified as TM in FIG. 3.

In the exemplary embodiment of the spectrophotometer in which the automatic scanning monochromator of the invention is utilized, a pair of different radiation detectors are shown, primarily to again emphasize that the automatic scanning monochromator of the invention is capable of being utilized over such a large (say, infrared) spectral range that there is presently available no single detector that exhibits a sufficiently high practical response to radiation over this large spectral range, and in particular at the two extremes of the entire spectral range of which the inventive monochromator is capable of precise use. Thus, over most of the (assumed to be infrared radiation) spectral range, a primary, substantially conventional thermally responsive detector (e.g., a bolometer, as schematically illustrated at B) may be utilized; but at one end (e.g., the quite long or far infrared, such as over 70 microns or less than about 140 or so wavenumbers range, a special detector SD is required (assumed to be, for example, a long wavelength infrared detector of the "Golay detector" type, see for example U.S. Pat. No. 2,557,096).

OPTICAL OPERATION

Although a general description of the operation of the invention has already been given in the introduction and a more specific description of this operation will be given after the structure shown in the remaining figures has been fully described, a brief synopsis of the optical operation is herewith given as a basis for understanding the more specific detailed operation of the various optical, mechanical and electrical parts and combinations hereinafter more fully described. Radiation from that one of the sources (S1, S2) will be converged or condensed by the first mirror C1 (which will be in its full line position for utilization of source S1 and will be pivoted to its dotted line position when source S2 is used), so as to form the first image I1 of whichever source is energized. This source is reimaged by the focussing mirror F1 at point I2 (in the ensuing description, the various plane mirrors, such as P1, P2 will be ignored, since their primary function is merely to fold the optical paths so as to reduce the physical length of an instrument incorporating a system of the type schematically shown in FIG. 3). The off-axis field toroid M3 is primarily to conserve the full intensity of the respective incident and reflected (R2) beams. The first or separating chopper CH1 will, as is well understood in the art and as is more fully described, for example, in the aforementioned British Pat. No. 1,157,086, corresponding to the above-noted United States copending application, separate the source radiation beam at R2 into two time-spaced alternate beams, namely, the transmitted beam TR and the reflected beam RR, as the various transmitting and reflecting parts (e.g., sectors) of the rotating chopping disc CD passes through beam R2. Each of these time-spaced beams will (after appropriate deflection by mirrors PT and PR respectively) be refocussed by the respective focussing mirrors FP and FR so as to form a pair of converging beams TR1 and RR1 so as ultimately to be converged to respective further images of the original source at IT and IR, respectively.

Solely for purposes of concreteness, it will be assumed that the transmitted beam (i.e., TR, TR1, IT, TR2, etc.) and its associated optical elements (FT, PT, ST2, etc.) will be the beam which bypasses the actual sample being analyzed, thereby being the so-called "reference beam" in a double-beam spectroscopic instrument (and in particular, a double-beam absorption spectrophotometer of the exemplary embodiment). Thus, it will be assumed that the sample to be analyzed is introduced (typically in a conventional sample cell) in the general vicinity of 26 in the lower beam (RR1, etc.), while the corresponding upper beam (TR1, etc.) will have, in the vicinity of 28, a "reference cell," containing no actual sample to be analyzed but otherwise being identical to the, say, sample cell introduced in the vicinity of 26 in the lower beam; in other words, the reference cell, if used, will typically be identical in structure to the sample cell and will contain the same solvent, if any, added to the actual analyzed sample if the sample is dissolved in such solvent, as is often done in conventional spectrometric analysis. Obviously, the immediately foregoing statements are merely intended to be exemplary, since the sample to be analyzed may be either gaseous or solid (and not dissolved). In general, the "reference beam" typically will have introduced whatever container is utilized (if any) for the sample plus (if applicable and practical) any environmental material not intended to be analyzed e.g., when the sample material intended to be analyzed is mixed with another substance not intended to be analyzed, the reference path would contain a similar cell containing only the "background" substance not intended to be analyzed. For example, if the instrument is being utilized to determine contaminates in, say, air, the reference cell would preferably contain pure air without the contaminates, which contaminates are actually the material intended to be spectroscopically analyzed.

After passing through the respective sample and reference stations 26,28, the two time-spaced beams TR2, and RR2, respectively will be refocussed by further mirrors FT2 and FR2 so as to strike as converging beams TR4 and RR4, respectively, opposite sides of the second or recombining chopper disc CD2, which will as is well understood in the spectrophotometer art (one complete embodiment of such recombining chopper being fully described in the aforementioned British Patent and corresponding copending U. S. application), cause the two time-spaced beams to form a single combined beam which will be focussed at image point I4. Mirror, M4, is preferably an off-axis toroid mirror, acting as an energy-conserving optical element (i.e., analogous to a field lens in a lensatic optical system), just as M3, previously described.

The particular shape of M4 and the shape of the other various concave mirrors form no part of the present invention. However, merely for purposes of the completeness and concreteness of description, it will be mentioned that the already described non-planar mirrors have (and are in a commercial instrument soon to be placed on sale by the assignee of the instant application) the following optical characteristics. The (source) condensing mirror C1 may be a (20°) off-axis toroid of say 87 mm. focal length; the first focussing mirror F1 may be a similarly off-axis (20°) toroid of, for example, 150 mm. focal length; the field mirror M3 near the chopper (CH1) may be a (30°) off-axis toroid having a focal length of 75 mm.; each of the next focussing mirrors for, respectively, the transmitted and reflected beams (TR and RR) may be identical 30° off-axis toroids of 150 mm. focal lengths; the second focussing mirrors FT2 and FR2, for the transmitted and reflected beams (TR2 and RR2) after they have passed through the reference and sample stations may be identical (15°) off-axis toroidal mirrors of 125 mm. focal lengths each; as already mentioned, the mirror M4 receiving the combined image I4 may be a (30°) off-axis toroid (acting as a field element) of 62.5 mm. focal length; the final focussing element, prior to the monochromator itself, at F3 may be a (15°) off-axis 167 mm. focal length toroid. The main monochromator mirror MM may be a 500 mm. focal length (high quality) spherical mirror, so as to form with the grating at the operative position OG a monochromator of the Ebert configuration or type; the radiation gathering or focussing mirror DM1 for the first or primary detector (which may be a bolometer, a thermocouple or other infrared sensitive detector when the exemplary instrument comprises an infrared spectrophotometer) is preferably an (on-axis) ellipsoidal mirror; while the second detector mirror DM2 for gathering radiation and substantially focussng it on the special detector SD (when it is used instead) is preferably a special off-axis elliptical mirror, known as a "Golay ellipse" when the special detector SD is a Golay detector of the type previously mentioned. The plane deflecting mirror DD is of course pivoted to its dotted line position when the special detector SD is intended to be used. Since none of these optics form any part of the instant invention per se, their exact configuration and in particular their specific focal lengths (and off-axis nature, if any) have been described merely for completeness and ease of understanding of how a specific embodiment may be constructed of an exemplary optical system which may be utilized with the automatic scanning monochromator of the invention.

Also merely for purposes of completeness of description of an exemplary embodiment of the instrument in which the invention may be incorporated, it is mentioned that where the entire instrument is intended to be an infrared spectrophotometer (and in particular one of the double-beam absorption type), the source S1 and S2 may be a Globar and a mercury (continuous spectrum) source, so as to supply a continuous spectrum (in the exemplary case from the near to the relatively far infrared) of source energy over a relatively long spectral range; obviously only one of the sources is used for each of the two (mathematically) contiguous spectral sub-ranges, which together comprise the uninterrupted long spectral range of the instrument.

Since the above description of the optical system of the instrument already includes much of the general operation of the instrument, it is felt appropriate to mention here those other general operation characteristics, as a guide to understanding of the specific structure hereinafter described. Thus as both already explained and generally well known to those skilled in the optical spectrometer art, the source, its immediate optics, and the two choppers CH1 and CH2 (which may have effectively a 1:2 chopping rate, e.g., a 15 cycle per second (H2) sector chopping rate and a 30 cycle per second (H2) sector chopping rate, respectively, as more fully explained in the already referenced British Patent and corresponding U.S. patent application), the various identically paired optics in each of the separated (i.e., transmitted and reflected or reference and sample beams), and the optics in the combined beam (i.e., after I4) will present to the entrance slit ES of the monochromator "white" radiation in the form of a sequential series of substantially alternating "pulses," each having at least an amplitude component which is, respectively, proportional to the intensity of the radiation passed through the reference and sample stations (28,26), i.e., respectively containing a component proportional to the relative amplitude of beam TR2 and of beam RR2. As previously explained, the monochromator will cause (in theory) a single wavenumber (or in practice, a very narrow spectral interval) from this broadband "white" radiation to be separated at its exit slit XS (including the effect of not only the operative grating at OG but also the order-separating filter that is in the operative position at OF), so that the detector being utilized (either PD or SD) will produce an electrical signal containing a time-spaced sequence of amplitude-modulated separable components (among others) which are relatively proportional to the intensity of substantially monochromatic radiation (at a specific wavenumber or at least a very narrow wavenumber interval) of originally equal (intensity) radiation beams as passed by the reference and sample stations (28, 26). Thus in the exemplary instrument incorporating the invention, the detector will generate an a.c. signal (ideally consisting solely of square wave components, but in practice, because of the limited bandwidths and in particular the relatively moderate response times of the detectors, typically being in the form of a.c. signal components varying from true square waves), which detector signal will comprise regularly spaced components representing, say, the relative transmissivity of the sample relative to the "blank" reference (in an absorption instrument) or some other similar meaningful optical property of a sample (in other types of instruments utilizing an optical monochromator). In the exemplary absorption spectrophotometer forming an exemplary environmental instrument for utilization of the automatic scanning monochromator of the invention, the particular detector signal form and an exemplary technique for separating the significant components thereof (free of undersired "background" radiation) are fully described in the aforementioned British Patent and corresponding pending U.S. application.

As is well understood in the spectroscopy art, the particular grating that is in the operative position OG will be slowly pivoted about axis GA (at least substantially in the plane of and parallel to the longitudinal axis of the elements, e.g., lines, forming the diffraction grating); this will cause the particular frequency, as measured, for example, in wavenumbers (or wavelengths) of the radiation reaching the exit slit XS to gradually vary over the useful range of the particular grating at the operative position OG In the multi-grating automatic scanning monochromator according to the invention, each of the (e.g., seven) gratings G1, G2, G3, etc., will typically be moved into the operative position OG, will be slowly tilted about axis GA (for example, by a scanning arm and cam arrangement which will be described hereinafter); and after it has been tilted or rotated through the particular scanning angle range at which it is utilized, it will be moved out of operative position OG by rotating the entire series of gratings in the direction indication indicated by the arrow GD, so as to bring into operative position the next grating. Obviously, the process may then be repeated with this next grating until each grating in turn has been brought into operative position, has been slowly tilted or "scanned," and has been moved out of operative position to bring in the next grating, and so on.

In order to assure that no more than one "order" of diffracted radiation from each grating (as it is utilized) passing through the exit slit XS reaches the detector (PD or SD, as the case may be), the aforementioned filter wheel FW comprises a series of relatively sharp spectral cut-off optical filters, so as to block at any given time all radiation above a certain frequency, and in particular any that is at least almost a full "octave" higher in frequency (say, in wavenumbers) from passing therethrough. In theory a filter could be used that has a cut-off slightly less than one octave higher (i.e., a cut-off of, say, 2X minus $d$, where X is any particular wavenumber from a particular grating and $d$ is a number smaller than X throughout the wavenumber range that X may assume) than the wavenumber range with which it is used. However, in practice a filter having cut-off only slightly less than one octave higher typically exhibits relatively poor complete blocking near its nominal cut-off (i.e., in the vicinity of 2X minus $d$). Accordingly, to insure that the various order-separating filters (as they are positioned at the operative filter position OF) do not substantially pass any substantial amount of the radiation more than one octave above the filter cut-off frequency (wavenumber), at the smallest value of X (in particular the smallest value of 2X), in practice it is preferable to utilize more than one filter for each grating. It is at least theoretically feasible to utilize any number of filters greater than the number of gratings used. However, to insure almost perfect (or at least equal) transmission of the entire wavenumber interval (at the desired, say, first order of the grating) which is intended to be passed by the filter, and at the same time to insure almost perfect suppression of all frequencies substantially beyond (i.e., higher than the desired cut-off) it is preferable to utilize substantially more filters then gratings. In addition, for reasons of simplifying the controlling of the changing of many filters (and gratings) even if non-mechanical means (e.g., control logic, as herein later explained) is used to cause the filter (and grating) changes, it is preferable that the number of filters used and the number of gratings utilized are expressible as a ratio of two relative small whole numbers (e.g., 2:1, 3:2, etc.). In order to assure that the transmissivity curve of each filter has a relatively high value over its utilized range, while also assuring that it has an extremely low transmissivity beyond its used range (so as to suppress substantially completely all other "orders" of diffracted radiation from the grating with which it is associated), the exemplary automatic scanning monochromator utilizes two filters for each grating. In particular, the designed optical frequency cut-off of each filter is substantially less than twice that part of the grating sub-range but more than this grating range with which the particular filter is used, so that a different filter is used for approximately a one-half portion of the used spectral range of each grating. Thus, in the purely exemplary embodiment utilizing seven different diffraction gratings, there are 14 relatively sharp cut-off filters arranged about the periphery of the (stepwise) rotated filter wheel FW. As will appear from the mechanical and electrical parts and specific operations hereinafter described, the filter wheel FW will be rotated so as to position a new filter at the operative filter position OF approximately at the mid-point of the scanning range, (i.e., near its middle wavenumber) as each grating is scanned (i.e., tilted about axis GA) when it is in the operative grating position OG. Although the exact number of gratings and filters is of course not critical, one of the characteristics of the instrument is its extremely high resolution, high monochromatic "purity" and high efficiency (i.e., ability to separate, without substantial attenuation, a very narrow spectral (wavenumber) interval from the "white" radiation available from the original source). Accordingly, the fact that a relatively large number of gratings are utilized, each only over that order (e.g., the first order) for which the grating is "blazed", and the utilization of a sufficiently large number of relatively highly transmissive filters over their efficiently utilized range, contribute to this high resolution high spectral purity and high efficiency over the extremely long (for example, seven octaves of) useful entire spectral range of the monochromator (and therefore of the instrument, e.g., spectrophotometer, in which it is utilized).

GENERAL MECHANICAL ARRANGEMENT

Returning to FIG. 2 which shows most of the mechanical components in somewhat simplified form in certain cases, those optical elements which are visible in FIG. 2 (comprising mainly the left-hand ones shown in FIG. 3 in detail) are referenced with the same reference characters in both figures, so that such common optical elements are not redescribed relative to FIG. 2. Rather, only the more important mechanical elements will be described in FIG. 2. Thus all of the gratings (e.g., G1 – G7) are mounted on a single rotatable component or sub-assembly, hereinafter referred to as the turret or "carousel" 30. The large element or component 32 near the center of FIG. 2, which as illustrated has one pair of substantially parallel straight line opposite edges and a remaining pair of substantially circular arcuate edges is, as will appear more particularly hereinafter (relative to FIG. 4), a substantially rigid solid plate, bearing on one (namely, the bottom in the exemplary embodiment) large surface, two related but different cam contour surfaces. As can be seen in FIG. 4 and as will be described hereinafter, each of these cam surfaces may act as the cam contour for determining the angular position of a single grating (linear wavenumber will be assumed hereinafter, but linear wavelength is of course also possible) scanning arm or lever 34, which is operatively connected to the entire carousel 30 and therefore to the particular grating in the optically operative position OG (compare FIGS. 2,3 and 4).

The recombining or second chopper CH2 in FIG. 2 (and the "splitting" or first chopper CH1 in FIG. 3), forming no part of the present invention may be driven at a constant speed of rotation, as for example by means of a synchronous (or other constant speed) chopper motor (not shown) and rotatively supported by a chopper bearing mount CM. Any suitable technique for establishing a fixed known chopper relationship, (as by the use of a single(synchronous) motor and a common (say, toothed, belt) drive for both choppers (CH1 and CH2). A chopper reference signal, i.e., one that has the same frequency and a known fixed phase relationship to the splitting chopper CH1, may be utilized to supply the demodulation system ultimately used to separate the "sample" electrical signal components (caused by the detector "seeing" the radiation transmitted through the sample station) and the "reference" detector electrical signal components, for example, by the means and methods disclosed in the aforementioned British Patent and its corresponding copending U.S. patent application. Since the exact type of "photometric system" (that is, the particular relationship of the "splitting" chopper CH1 and the recombining chopper CH2) form no part of the present invention, none of the details of the specific choppers, their common drive, the detector electrical signal processing (i.e., demodulation circuits) or the like are included herein; nor is it intended to be implied that the photometric and detector system of the aforementioned British Patent and corresponding copending U.S. application is required (although a system of this type is preferred) in a double-beam optical instrument embodying the automatic scanning monochromator of the instant invention.

Similarly, since none of the source optics, the choppers or even the optics between the recombining or second chopper CH2 and the entrance slit ES of the monochromator form any particular part of the invention herein, the main purpose of the illustration of the right-hand side and middle portion of FIG. 3 is merely to give an exemplary environment (involving a spectrophotometer) in which the high-precision, long-range automatic scanning monochromator of the present invention may be embodied. Thus, it may be said that only those parts (as hereinafter more specifically described) contained within the monochromator housing 24 (see FIG. 2) and certain parts of the control components, generally contained within the control console 10 (FIG. 1) are directly related to any integral part of the instant invention. Accordingly, those parts shown in FIG. 2 outside of console 10 and housing 24 are intended to be merely exemplary in nature and are therefore not further described, other than to note that a typical sample and reference cell (when the monochromator of the invention is utilized in a double-beam spectrophotometer, for example) are indicated in broken lines in this figure.

Additionally, even the elements within the monochromator housing 24 in FIG. 2 adjacent its right-hand wall 25 do not, per se, form any part of the instant invention (other than to supply a complete environmental exemplary embodiment), and therefore these elements are not further described, since their important functional characteristics have already been described in the detailed description of the optical schematic of FIG. 3. Thus, the more important optical elements directly on the source side of the monochromator in FIG. 2 (i.e., within housing 24 but near the right-hand wall 25 thereof) are merely referenced in FIG. 2 (with the same reference characters as in FIG. 3); and since their mechanical mounts and the like are also not germane to the instant invention, none of these elements are described. In general, only those elements shown in FIG. 2 that are shown in more detail in FIG. 4 (or in the other higher numbered detailed figures) are sufficiently related to the instant invention as to warrant detailed description. However, it is mentioned that the cam 33 and the cooperating follower 35 on the end of lever 37 (which are shown in FIG. 2 but not in FIG. 4) represent a preferred embodiment of a slit-width controlling (logarithmic) cam assembly of essentially known type. Except for the fact that the means (e.g., a motor, with or without a gear train, none of which are shown) for driving the cam 33 is itself controlled in a manner which is not conventional in the art, the elements of the slit opening cam assembly (33, 35 and 37) (part of arm 37 which is also shown in FIG. 4) do not in themselves form any part of the instant invention.

Although in one sense, the broad utilization of a filter wheel, as at FW and a drive means for stepping a different filter into the optical path (compare FIGS. 2, 3 and 4) is also not, in of itself, novel, nevertheless the means for timing or "programming" the intermittent rotational driving of filter wheel FW is believed to be novel and does form one of the novel features of the automatic scanning monochromator of the invention; for this reason, the structure, broadly involving the drive motor 40, its operative driving connection 42 to the rotatable filter wheel, and in particular the manner in which motor 40, connection 42 and the associate elements are controlled, are therefore both shown and described in detail in FIG. 4 (and later FIG. 11) hereinafter. The only other significant elements shown in FIG. 2 that are not described in detail later relative to FIG. 4 (or higher numbered detailed figures) are the already described primary and special detectors TD and SD, respectively, their respective focussing mirrors DM1 and DM2, the movable detector deflecting mirror DD and in particular the schematically illustrated output leads from the primary detector and the special detector at PO and SO, respectively. The detector deflecting mirror DD is preferably mounted so that it may be moved from the position indicated in FIGS. 2 and 3 to a position no longer intercepting the radiation issuing from the exit slit XS (and passing through the filter in the operative position OF), so as to allow the radiation to reach the special detector SD via its generally elliptical detector mirror DM2 when the special detector is utilized (e.g., in the very far infrared). Such movement of the detector deflecting mirror DD may be accomplished, either manually by for example a flexible cable driven by a manual knob or automati-cally, (for example, by means of a small rotary solenoid or the almost equivalent structure of a motor and a pair of limit switches), schematically shown in FIG. 2 as the detector deflecting mirror rotation means DR, so as to move the detector deflecting mirror DD in a clockwise direction about axis DA, for example, to the dotted line position shown in FIG. 2. Obviously when it is in its normal or full line position in FIG. 2, the primary detector PD will receive the monochromatic radiation from the exit slit XS of the monochromator; while when the detector deflecting mirror DD is in its retracted (clockwise) position shown in dotted lines in FIG. 2, the special detector SD will receive and detect the monochromatic radiation. Thus, most of the time the primary detector PD will receive the radiation and produce an electrical signal over its output lead, schematically shown at PO, but under special circumstances (e.g., an extremely long infrared), when the mirror DD is in its dotted line retracted position, the special detector SD will receive the radiation to produce a proportional electrical signal over its electrical output schematically shown at SO.

MAIN COMPONENTS OF THE DISPERSION SYSTEM

FIG. 4 shows in greater detail the main elements of the dispersion system, namely, the plurality (e.g., seven) of diffraction gratings and its supporting carousel 30; the wavenumber scanning arm 34 for rotating the particular grating at the operative position OG; the two cam contours for moving this scanning arm by means of its follower 36, namely, a large outside contour 44 and a smaller, substantially concentric cam contour 46, both rigidly formed on the (bottom) large surface of the generally plate shaped cam 32; the filter wheel FW; and at least part of each of the three separate drive means for the grating carousel, the wavenumber scanning cam and the filter wheel indexing motor (40). It should be noted that the cam axis or axle CA (shown both in FIGS. 2 and 4 generally) and the corresponding grating "carousel" or turret axis or axle TA (in FIGS. 2 and 4) are both formed of high-precision low-friction ball bearings as may be seen in FIG. 5 (and as to the cam bearing also in FIG. 6). The use of such precise, low-friction bearings means directly contributes to the desired precision of the automatic scanning monochromator of the invention. However, since ball bearings per se of course well known, are incorporated in the axles or rotative bearings of the grating turret 30 and the cam plate 32 in a manner requiring only (good) engineering skill, and their exact structure is readily apparent from the detail figures (see FIG. 5), the particular elements of these precision bearings are not specifically described but only the parts (and their operation) supported by these bearings are hereinafter specifically described. Each of the main assemblies of the monochromator (the grating turret or carousel 30, the cam plate 32 along with its two integral different cam contour surfaces 44 and 46, the scanning arm 34 and the manner in which its follower 36 engages one of the cam contours and its other end moves the entire grating carousel so as to tilt the particular grating in the operative position OG about its own grating axis GA as well as the filter wheel FW, the individual drive means for each of these assemblies, and the operative connections, which are both mechanical and electrical, between these various assemblies and elements) will not be described in turn.

GRATING TURRET DRIVE

As may best be seen in FIGS. 4 and 5, the main structural element of the grating turret or carousel 30 comprises a generally cylindrical shaped (open at the top) single casting 50, having an integrally formed hub portion 52 (see FIG. 5). Preferably this integral turret element 50, 52 includes recesses or holes, so as to reduce its total weight and therefore its total inertia as may be seen at 54 in FIG. 4 and 56 in FIG. 5, for example. Hub portion 52 and therefore the entire main structural element 50 of the carousel 30 is rigidly and precisely (but in such manner as to allow disassembly) attached to a main grating turret shaft 51 (acting as the turret axis TA), as by means of threads 53 on shaft 51 and a conventional removable nut 55. Shaft 51 is supported by means of upper and lower ball bearings 57 and 59 to a rigid, nonrotatable (relative to axis TA) generally cylindrical or stationary hub member 61, which in turn is rigidly attached (as by being integral therewith) to a main plate 63.

The bottom of the grating turret hub 52 includes a reduced shoulder portion 58, to which is rigidly attached a relatively large pinion gear 60, so that rotation of pinion 60 will cause rotation of the entire grating turret or carousel 50,30. Pinion 60 is in mesh with and driven by a pinion 62, which in turn is rigidly attached to the upper end (65) of vertical central driving shaft 64, which itself is supported as by oilite bearings within a stationary outer shaft or hub 94. The lower end of intermediate driving shaft 64 has rigidly attached thereto a driven bevel gear 66, which in turn is driven by driving bevel gear 68. (Compare FIGS. 5 and 9). As may best be seen in FIG. 9, driving bevel gear 68 is rigidly attached to shaft 70, supported in a bushing 71, which in turn is supported by a depending portion 72 of a bracket or subframe 74 attached to a main mechanism plate or other rigid support 76 as by a threaded bolts or screws 75. Shaft 70 (and therefore bevel gears 68 and 66, shaft 64, pinions 62 and 60, and therefore the grating turret or carousel 30 itself) is rotated by motor 80, and in particular its output shaft 82, through a releasable clutch 84. Since any type of clutch may be used at 84 to releasably couple the output or driving shaft 82 at the motor to shaft 70 (an electromagnetic clutch being the preferred type), the details of the clutch are not shown. However to better understand the operation of the grating turret or carousel drive mechanism and in particular the manner in which the grating carousel may be moved to any one of the (seven) angular positions so as to place a particular grating in the optically operative position OG (compare FIGS. 2-5), it will be assumed that clutch 84 is electrically actuated, and that its "live" electrical lead is the wire shown at 86, which may be connected at 87 to (one of the) corresponding "live" wire 88 energizing motor 80, so as to result in a single "live" input wire 90 energizing both the motor and the clutch simultaneously. Thus, whenever a voltage source is supplied to the common "live" input wire 90, both the motor and the clutch will be simultaneously energized; similarly opening of such an energizing circuit including common input 90 will cause de-energizing of the motor (i.e., its stopping) and of the clutch (i.e., its releasing the connection between shafts 82 and 70) simultaneously. In this manner any overrun of the motor (caused by inertia) or subsequent drag of the motor on shaft 70 (when the motor stops) is eliminated as a significant factor affecting the grating turret, since the clutch 84 disengages the motor shaft 82 from the elements indirectly connected to the grating turret or carousel as soon as the clutch is, say, de-energized (obviously the clutch could be designed in the opposite sense to that it couples the shaft 82 to shaft 70 only when it is energized, but it will be assumed that its operation is as just previously stated, solely for exemplary purposes).

As may be seen in both FIGS. 5 and 9, the shaft 64 (forming part of the driving connection between the grating interchange motor 80 and the grating carousel 30, (i.e., main structural turret element 50, which in turn supports at its periphery each of the gratings, say, G1-G7) is surrounded by a separately rotatable hollow shaft 94 which is rigidly connected to (as being integral therewith) a tappered hollow hub 96, which is rigidly mounted in a thickened portion 76' of lower main mechanism plate 76 as by nut 97. Hollow shaft 94 rotatably supports the wavenumber scanning arm 34 (compare FIGS. 4 and 5) by means of upper and lower ball bearings 67, 69 which allow the rotatable depending cylindrical portion 34' (or 400) which is rigidly connected to (e.g., integral with) the scanning arm 34. As previously noted relative to FIG. 4, the opposite ends of the wavenumber scanning arm are operatively connected respectively at one end (through a follower 36) to one of the cam contours 44,46 of cam 32, and at the other end to the grating carousel (through portion 34' and elements 63 and 61) so as to tilt the operative grating (assumed to be grating G1 in the particular position of the grating carousel 30,50 shown in FIGS. 4 and 5). Before describing in detail the manner in which the scanning arm 34 is so connected at its other (right-hand) end to one of the contour surfaces of cam 32, as may be seen in FIGS. 4, 5 and 6, how the main driving element of the scanning arm, namely, the cam 32 and its various connected parts are rotatively mounted and driven will first be described. Accordingly, the cam assembly will first be described relative to its general showing in FIG. 4 and its more detailed showing in FIG. 5 and (as to its driving connection) in FIG. 10.

(WAVENUMBER) CAM DRIVE

As may best be seen in FIG. 5, the plate-like cam 32 is rotatively supported, as by being removably fastened to the upper end of supporting rotatable shaft 100, as by providing a threaded portion 93 on the upper end of the shaft and a conventional cooperating nut 95 (as with the corresponding conventional fastening means indicated for the grating shaft at 53,55, a conventional or lock washer, shown but not referenced, may also be provided). Preferably the aperture 97 in cam 34 and the mating upper end 99 of shaft 100 have complementary tapers to insure precise centering of cam 32 relative to shaft 100. The shaft 100 may be precisely rotatably supported as by precision bearings 97,99 relative to a generally cylindrical, stationary supporting structure 102, which is in turn rigid (as by being integral) with the main mechanism plate 76. The rotatable cam-bearing shaft 100 has rigidly attached thereto (below the mechanism plate 76) a driven worm wheel 106 (as by spacer 103 and nut 105). Worm wheel 106 is driven by a worm drive assembly 110, the main (driving) element of which is a main worm 108 (compare FIGS. 5 and 10). As may best be seen in FIG. 10, main worm 108 is non-rotatably attached (as by means of a pin or the like, not shown) to main driving shaft 112, so that rotation of shaft 112 will cause worm 108 to drivingly rotate (at a much slower angular rate) worm wheel 106, and therefore cam shaft 100 and the main cam plate 32. The shaft 112 may be driven by any convenient (preferably adjustable in ratio) speed reduction means, generally indicated at 114 which in turn is driven by an electric motor (not shown), preferably a stepper motor. In particular the output shaft 116 of the variable) speed reduction means 114 (which may consist of a conventional gear transmission) may drive worm shaft 112 by means of conventional pulleys 118,120, connected by a belt 122.

Since, as will appear more clearly hereinafter, the precision of the angular position of the cam plate 32 as determined by the wavenumber readout of the monochromator is affected only by the precision of shaft 112 and the elements between this shaft and the cam 32 (i.e., including elements 100,106 and 108 of those so far described), the exact form of the mode of means for the speed reduction mechanism 114, its internal construction, i.e., a variable gear transmission system, and even its connecting elements 116-122 are neither critical nor form any particular part of the precise cam plate drive required to yield precision and accuracy in the angular rotation of cam 32 (and of course the scanning arm 34 and the grating to which this arm is attached) relative to the wavenumber readout, soon to be described. On the other hand since all elements connected to cam plate 32 that are less remote (in the mechanical sense) than shaft 112 do effect the precision of the wavenumber readout (and in particular relative to the angular position of cam 32, scanning arm 34 and the tilt angle of the operative grating about its axis), all such elements must be substantially free of imperfections or "play" (e.g., backlash). For this reason, the main worm 108 is provided with a spring-loading of its respective bearings 132, 142. In particular, a spring 126 urges the right-hand bearing 132 to the right by means of force applied through worm 108 and precision spacer 128. The bearing 132 is precisely held in a rigid main housing or support element 140 of the drive 110 (which housing 140 may in turn be precisely located as by locating pins 136,138). A low-friction precise left-hand bearing shown generally at 142 (and substantially an identical ("-mirror image") to the bearing 132 (including balls 130) is similarly "loaded" by the spring 126. To reduce or substantially eliminate any possibility of backlash, a second worm 148 (generally identical to worm 108) is connected to shaft 112 by means of a pair of bevel gears 152 (rigid to shaft 112) and 154, rigidly connected to shaft 156, to which the second worm 148 is keyed as by means of pin 158 in a slot in hub portion 160 rigidly or integrally connected to the worm 148. The conjoint or integral hub and auxilliary worm (160,148) are urged against pin 158, as by means of a spring 162, bearing against a backing element 164, rigidly attached to the lower end of shaft 156 (as by pin 166). The spring 126 on shaft 112 thus acts to load the bearings 132, 142, so as to precisely locate the first worm 108 (in space). The second worm 148 has its loading spring 162 bias the worm 148 upwardly in FIG. 10, so as to resiliently urge the worm wheel in the clockwise direction. In this manner, the pair of worms 108,148 and their associated locating means assures that worm 106 is precisely located in space, even if some "play" is inadvertently allowed to remain in wheel 106 and its precision mounting means or some should develop (for example by way of precision bearings 97,99). The left-hand end 112' of the precision driving shaft 112 is coupled to a relatively high speed (preferably digital) "shaft encoder", generally shown at 170, for example by means of a precision flexible coupling 180.

Because of the manner in which all of the elements mechanically connected from shaft 112 to the cam 32 and to the (first) shaft encoder 170 are all precisely interconnected, the shaft encoder 170 will have an angular position directly proportional to the relative angular position of cam 32 at all times. More particularly, the (preferably digital) electrical readout on output lead 200, representing the angular position of the shaft encoder 170 will be directly proportional to the angular position (of encoder 170 and therefore) cam 32. Thus, the signal arm output lead 200 of this first or "high speed" shaft encoder 170 acts as a direct readout of the angular position of cam 32, regardless of the imprecision in parts more remote (in the mechanical sense) from both the encoder 170 and the cam 32 than shaft 112. The shaft 112 (and the main worm 108 and of course the same speed auxilliary worm 148) rotates substantially more rapidly than cam 32 because of the speed reduction effect of the driving relationship between worm 108 (and 148) and the worm wheel 106, which may, for example, cause a 25:1 reduction in the angular speed of driving shaft 112 relative to the driven cam shaft 100 (and therefore obviously the cam itself). Thus, the electrical output at 200 of the "high speed" or first encoder 170 will give a "-fine" indication (in the form of an electrical signal, preferably of a digital nature) of the actual angular position of the cam 32. More particularly, when the cam contours 44,46 are chosen so as to cause the scanning arm 34 and therefore the operative grating to be rotated in such a manner that the grating tilt about its axis (TA) is proportional to the cosecant of the angular position of the cam 32, the angular position of shaft 112 (which is obviously directly proportional to the angular position of the cam) and therefore the angular position of the high-speed encoder 170 will be directly proportional to the frequency, (as conveniently measured in wavenumbers), of the monochromatic radiation dispersed by the grating and the Ebert monochromator mirror MM so as to reach the exit slit XS. Purely for exemplary purposes it will be assumed (as is true of an embodiment of the invention actually utilized in a double-beam infrared absorption spectrophotometer) that the wavenumber range of the entire monochromator is from about 4,000 down to, say, about 33 wavenumbers (corresponding to 2.5 to 300 micron infrared radiation in wavelengths). The high speed or fine shaft encoder 170 thus provides a signal giving the "least" significant (i.e., the smaller valued part) digit or digits of the wavenumber of the radiation dispersed by the particular tilt (caused by scanning arm 34 and in turn by the particular contour 44,46 being used of cam 32).

Since each of the gratings has a different wavenumber range (varying by a single octave or factor of two in the exemplary embodiment), and since one of the two different scanning cam contours 44,46 is used with the higher wavenumber gratings, namely, contour 44, while the other (46) is used with the lower wavenumber gratings. It is difficult to express the general relationships between the exact output values (say, in wavenumbers) of the high-speed or fine-shaft encoder 170, unless a specific type of readout is assumed (purely for exemplary purposes). It will therefore be assumed hereinafter that the output lead 200 of the high-speed or fine encoder 170 supplies a signal in digital (binary bit) form, and in particular gives the least significant or smaller value binary bits of the entire (binarily expressed) wavenumber value of the monochromatic light leaving the exit slit XS. It will also be assumed (purely for exemplary purposes) that the monochromator disperses radiation over the range previously mentioned (namely, from about 4,000 wavenumbers to about 33 wavenumbers). Since the entire range of a particular (namely, the grating G1 used during the highest wavenumber octave range of from about 4,000 to about 2,000 wavenumbers may be expressed by a binary "number" having 16 bits if a precision of one-tenth of a wavenumber in 4,000 (i.e., readability precision of 4000.0) is desired, the exemplary wavenumber range of the longest wavenumber grating G1 of the exemplary monochromator may be expressed as a 16-bit binary "number". If a (low-speed) coarse encoder is provided on the more slowly rotating cam shaft 100, as generally indicated at 210 in FIG. 5, which coarse encoder provides, say, at least the six most significant binary "bits", then the (high-speed) fine encoder 170 need only supply at least 10 (of the lesser significant) binary bits. In one exemplary embodiment of the invention (actually made) a 10-bit (grey) binary encoder of a type readily commercially available, was used at 170 in FIG. 10, in conjunction with a (low-speed) coarse encoder 210 (about to be described) which is capable of producing (originally in conventional, non-binary form) the equivalent of at least an approximately six binary bit "number" i.e., can produce the most significant six binary bits of a 16-bit binary number (i.e., 32,768; 16,384; 8,192; 4,096; 2,048; and 1,024).

Returning to the lower right-hand part of FIG. 5, a support plate 212, rigidly attached to said housing 140 at 214, rigidly supports the relatively stationary encoder disc 220 of a low-speed (coarse) encoder 210, as by means of a circular, centrally apertured spacer 216 and any conventional fastening means (e.g., screws) 218. The lower surface 222 of the stationary encoder disc 220 will carry a plurality of electrically conductive (relatively thin) contacts, arranged generally in a circular pattern about surface 222; in a particular embodiment of the invention, these contacts comprise a circumferentially arranged series of discrete radially extending strips 224 (see FIG. 14). An electrical pick-off or wiper assembly 226, rigidly attached to the lower end of shaft 100 (and therefore obviously rigidly turning with cam 32) includes an electrically conductive hub portion 228, a similarly conductive arm portion 230 and a wiper or brush 232. A pair of wipers and a pair of concentric contact rings may be preferably used in practice. Obviously the exact structure of the encoder pick-off (228–232) is neither critical nor forms any part of the present invention per se. However, in the exemplary embodiment, there are say 25 such segment of the cam 32 was opposite any particular fixed point or radial line (in the plane of the paper in FIGS. 2 and 4 and through the cam axis CA).

Thus, the low-speed (coarse) encoder 220 will give an approximate indication of which such (say 14.40) segment is in driving relationship (i.e., contacting) the scanning arm cam follower 36 (compare FIGS. 4 and 6). In the actual exemplary embodiment, wherein the effective (angular) speed reduction between driving worm 108 (and 148) and worm wheel 106 is 25:1, in order to uniquely determine the particular angular position of the cam 32 to one part in 25, the encoder disc 220 should contain 25 such contacts 224; since otherwise the high-speed encoder 170 would become ambiguous after each complete rotation of driving shaft 112 (see FIG. 10), and therefore after each 1/25 of a rotation of worm wheel 106 and of a similar fraction of the rotation of all the parts attached to shaft 100 (i.e., low-speed encoder 220 and cam 32).

Although for practical purposes it is preferable to convert the, say, 25 discrete electrical signals supplied by the (low-speed) coarse encoder 220 into binary form (which requires only a six-bit binary matrix to indicate all possible values from 1 through 25 (zero of course being excluded) in order to simplify the binary "addition" of the already binary output at 200 from the fine (high-speed) encoder 170, in theory it is not absolutely necessary to do so. The important functional relationships between the coarse low-speed encoder 220 and the fine (high-speed) encoder 170 is merely that the low-speed encoder provides sufficient "coarse" information to remove any ambiguity in the fine encoder 170 (the input shaft 112, 112' of which may make 25 entire rotations, in the exemplary embodiment).

Generically speaking, it is only necessary to somehow measure the angular position of the cam 32 to the desired precision (say 0.1 part in 2,000.0) over the relatively large wavenumber range (say, about 32 to 4,200 wavenumbers) corresponding to the useful range of the instrument. In practice and in particular in the preferred exemplary embodiment of the invention, it has been found advantageous to provide a coarse encoder (220) directly coupled to the cam and a fine encoder (170) which is operated at a much higher (proportional) speed, so as to make practical the "fineness" of the divisions between each of the readable positions of the "least significant" bit or angular division of this fine (high-speed) encoder (170). As previously noted, the combined encoders 170, 220 of the preferred exemplary embodiment of the invention are therefore capable of reading uniquely, and precisely to within one-tenth of a wavenumber, at least throughout the entire range of about 32 to about 4,200 wavenumbers, for the exemplary monochromator shown (and already mostly described) in FIGS. 2–5 and in the yet to be described FIGS. 6–8 and 11.

Since a 16-bit binary register can contain or represent any integral (Arabic) number from 1 through 65,535, it is obvious that such a register is capable of "readability" to better than one part in 42,000, or if the last or least significant (Arabic) digit is to the right of the decimal point, 0.1 part per 4,200.0. Thus, the 16-bit binary logic system may preserve (if it is available from the optical and other parts of the instrument) a precision in excess of one part per 60,000 (or 0.1 in 6,000.0). However, since the low-speed encoder does not yield a full 6-bit binary output (e.g., 31 in Arabic numerals) since it contains only 25 discrete contacts, the total of numbers (expressed in Arabic form) are somewhat less than the maximum (65,535) that would be obtained if the low-speed encoder were capable of supplying an entire six-bit binary matrix. However, since the high-speed encoder does provide a full 10 bits of binary information and the low-speed encoder provides 25 of the 31 decimal (Arabic) bits that a six-bit binary encoder can contain, there are available substantially more than 15 binary bits of information (i.e., substantially 32,767 in Arabic form) although somewhat less than the full 16 bits (65,535). In particular, the actual highest number supplyable by the 25 rather than 31 "six-bit" output of the low-speed encoder and the full 10 binary bit matrix available from the high-speed encoder provides a capacity of approximately 51,000 decimal (Arabic) number "bits". Thus the actual readout is still more precise than one part per 42,000 (or as actually used in wavenumbers 0.1 parts per 4,200.0).

GRATING CAROUSEL MOVING AND INDEXING MEANS

As previously described, whenever the motor 80 is energized over lead 88 (and in the somewhat schematically illustrated specific embodiment therefore over common input lead 90) the entire train of elements connecting the motor, including electrical clutch 84 (actuated over the lead 86) and mechanical elements 62–70 will be rotated, so as to drive the carousel 30,50 by means of its rigidly attached gear 60 in a particular direction, assumed to be clockwise in each of FIGS. 2, 4 and the above to be described FIG. 7 (as indicated by the arrow showing the grating direction GD). As may best be seen from a comparison of FIGS. 5 and 7, a shoulder portion 240 near the lower part of the main carousel structure 50 (but just above the rigidly attached gear 60) is formed on its periphery with a cam-like contour, having as many "high" portions or lobes 241, 242, 243, etc. as there are different gratings on the carousel (e.g., seven in the exemplary embodiment). Each of these high portions of the cam-like integral or rigid shoulder 240 has therebetween a low or notch portion 251, 252, 253, etc. (see FIG. 7). A spring-loaded toggle lever 260 rides on the peripheral surface of the cam-like shoulder 240, thereby following the contour of the various lobes (241–247), low points or "troughs" (251–257) and the corresponding slowly rising leading edges 261, 262, 263, etc. and the more rapidly "falling" trailing edges 271, 272, 273, etc. of the lobes. In particular the spring-loaded toggle lever in the exemplary embodiment comprises a rigid or integral, right-angled lever 280, pivoted (by any conventional means) on the axis concentric with screw 282, and bearing at one end 284 of one of its right-angle arms a follower 286 (for example in the form of a wheel rotatable about an axis 288). The other right-angle arm 290 of toggle 260 is resiliently biased as by spring 292, so as to urge the entire toggle lever 260 in a clockwise direction about its pivot axis defined by element 282, thereby causing the follower 286 to be urged against the peripheral contour of the cam-like shoulder 240. Arm 290 of the toggle (260) also has rigidly attached (as being integral therewith), generally at its end remote from pivot axis 282 a switch-actuating portion 294, which cooperated with the movable switching element 296 of a switch 298. Switch 298 (the electrical parts of which are not shown in FIG. 7) may be a conventional known flip-flop type switch (e.g., a microswitch) of the type that is opened and closed by repetitive operation of the switch arm 296 relative to its circuit from its input lead 300 to its output lead 90' (which ultimately controls the electrical energy supplied to lead 90 in FIG. 9). Thus as long as cam follower 286 is substantially at a "high" or lobe portion (241, 242, 243, etc.) of the rotatable peripheral cam-like shoulder 240 and in particular between, say, points corresponding to 264a and 274b, the circuit from input lead 300 through switch 298 to its output lead 90' and then (through a logic circuit) to the motor 80 and clutch 84 will be effectively closed, so as to maintain actuation of both of these last mentioned mechanical elements. Obviously various conventional intermediate electrical elements (e.g., relay switches), transistors, other logic elements or the like generally are positioned between leads 90' and 90 in order to reduce the current-carrying requirements of switch 298, if desired, and to provide the just described control of motor 80 and clutch 84 and the about-to-be described other function of the switch. Thus the switch element 296 of switch 298 has such clearance relative to switch-actuating portion 294 as to be moved so as to change the circuit through the switch 298 whenever the follower 288 reaches a point of substantially the "height" of points of, e.g., 261a, 262a, 263a, 264a, etc., on the leading edge or the equivalent "height" of portions 271b, 272b, 273b, 274b, etc., on the trailing edge of the lobes of the cam-like plate or shoulder.

As the carousel and therefore the cam-like shoulder or plate 240 in FIG. 7 rotates clockwise the toggle lever 260 will be slowly pivoted by gradually increasing leading edge 261 (262, 263, etc.) until the toggle 260 is biased by a point 261a, 262a, 263a, 264a, etc. on a leading edge (e.g., 261, 264) of each of the lobes (241-247). The resulting movement (by switch-actuating element 294) of the switch arm 296 will change the condition of (say, close) switch 298, so as to cause a signal over a second output 299 thereof to cause a blocking element (364, 368 of a pivotable blocking arm 340, to be described relative to FIGS. 11 and 12 hereinafter) to move into the path of a stop means (310-328, also to be described hereinafter) so as to insure that the grating carousel does not turn through more than a fraction of the (360°/7) angular spacing between gratings. This prohibits the carousel from going past the grating desired to be used as well as insuring that the next grating will be exactly "indexed" into the same circumferential angular position relative to the carousel or turret axis TA (as will be clearer hereinafter). Specifically, this first switch arm movement at "rising" points 261a, 262a, 263a, 264a, etc., causes de-energizing of a rotary solenoid 354 through its input 370, as will be subsequently described relative to FIGS. 11 and 12, to move blocking lever or arm 340 and therefore its blocking element 364, 368 into position to stop the (next higher numbered) grating by means of its associated stop means 310 (e.g., 311) in FIGS. 8, 11 and 12 later described. As the carousel is moved further (in the clockwise direction) the switch-actuating element 294 of toggle lever 260 will be held against the switch arm 296, maintaining the output at 90' in such a condition (say, "on") as to cause (through, say, a logic circuit) ultimately the circuit to both motor 80 and (electromagnetic) clutch 84 to remain closed until the next point 271b (of the same "height" as point 261a) is reached. Then the motor and clutch are again stopped by de-energizing their common input 90 as already noted. This of course disconnects motor 80 (and at least the main part of clutch 84) from the rest of the carousel drive elements (e.g., 64-70 in FIG. 9) so as to reduce the inertia of the carousel assembly.

At this point toggle lever 286 will be in a position on the relatively steeply decreasing (in radial distance) edge portion 271 or 272, 273, etc. (at least between points 271b and 271c, 272b and 272c, etc.) so as to cause at least some part of surface 271 to be contacted by the follower 286 of the toggle 260. By utilizing a relatively strong spring at 292, the toggle 260 will always be biased with a substantial force in its clockwise direction; therefore follower 286 will apply a substantial force or clockwise torque on following edge 271 (or 272, 273, etc., as the case may be) and therefore the entire carousel assembly once the follower has passed beyond the highest point of the respective lobe of element 240. In this manner a clockwise torque of substantial magnitude is applied to the carousel, which is especially effective after motor 80 has been disconnected from its mechanical drive and the inertia thereof eliminated. As will be obvious from FIG. 7, the carousel would therefore continue to turn until toggle lever follower 286 were to reach the lowest point or trough, say, 251 of element 240; however before this can occur one of the (seven) mechanical stops (320) effectively rigidly connected to the carousel housing 50 will encounter a stopping surface (namely, on a blocking arm or lever 340), about to be described.

The mechanism for stopping the carousel (and therefore for precisely indexing the particular grating to be utilized into exactly the "correct" operative position OG) will now be described relative to FIGS. 4, 8, 11 and 12. As may best be seen from FIGS. 4 and 8, the main carousel housing structure 50 has rigidly attached thereto a peripheral series of radially extending identical projections, identified generally at 310 (in both FIGS. 4 and 8), the upper left-hand one of which in FIG. 4 is specifically identified at 311. Each of these radial projections carries, preferably in an adjustable manner, a tangentially extending stop pin, of especially hard metal (to resist wear), generally referenced 320, the one associated with the particular radial extension 311 being specifically labeled 321 (compare FIGS. 4 and 8 with FIGS. 11 and 12). As just noted, the exact position of the clockwise pointing rounded end portion of each of these stop pins 320, shown generally at 324, is preferably adjustable along its own axis (i.e., in the tangential or generally circumferential direction relative to the grating carousel 30, 50 as may best be seen in FIG. 4). More particularly, as may best be seen in FIG. 11 and 12, each of the stop pins (320) as exemplified by the particular pin 321 may be adjustably but rigidly connected to its respective arm (310) in general and the particular arm 311 shown in FIGS. 11 and 12, for example by means of providing an internally threaded bore 316 in each of the arms 310, and providing mating threads on the external surface of at least a substantial portion of each of the stop pins 310 as may best be seen at 326 in FIGS. 11 and 12. A locking nut 328 may be provided on each of the threaded stop pins 320, to insure that each of the stop pins remains in the same position relative to its own radial projection 310, once each of said pins 320 has been adjusted. The reason for requiring both precision and stability of the placement of stop pins 320 relative to each of the projections 310 is that the rounded end surface 324 of each of the pins 320 determines the exact "indexing" of the rotative position at which the carousel stops for positioning each of the various gratings (G1-G7) exactly in the correct operative position OG. In particular, the rounded point or leading surface 324 of a particular one of the stop pins (shown as stop pin 321 in FIGS. 4, 11 and 12) will engage a single pivotable blocking means or arm 340, whenever this arm is in the position shown in each of FIGS. 4, 11 and 12. More particularly, blocking arm 340 (see FIGS. 11 and 12) is rigidly connected to a pivot pin 342, which in turn is precisely mounted by means of a pair of precision (i.e., pre-loaded) ball bearing means 344, as may best be seen in FIG. 11, to a rigid support 346, which in turn is rigidly fixed to (or actually part of in the exemplary instrument) (compare FIGS. 4 and 11) of scanning arm 34.

Suspended rigidly from the same fixed support 346, as by means of an L-shaped bracket 348 and conventional fastening means (e.g., screws) 352 is a rotary solenoid assembly, shown generally at 350 (see FIG. 4 and especially FIG. 11). The main motive element 354 of solenoid assembly 350 is of a well known type, in which its rotary armature, and therefore its main output shaft 356 and the arm 358 rigidly attached thereto, will assume a particular angular position about its rotary axis (i.e., a vertical line as seen in FIG. 11) extending through the center of the active element 354 of the rotary solenoid, as well as the center of pivot pin 342. Thus the upwardly extending connecting pin or rod 360 (and more particularly its head portion 361) which engages in an aperture or recess 362 in the lower surface of blocking lever 340, will normally position this blocking means in the manner shown in FIGS. 4, 11 and 12. In particular, this will cause the blocking edge surface 364 (of extremely hard metal, to avoid wear effects) of blocking lever 340 to be positioned in the path of and therefore cause abutment of the rounded leading end portion 324 of stop pin 320. As may readily be seen from FIGS. 4, 8, 11 and 12 (and in particular FIGS. 4, 11 and 12) this will cause the grating carousel to be stopped in a precise particular angular position whenever the pivotal blocking lever 340 is in the position shown in these figures, rather than in the dotted retracted position indicated at 340' in FIG. 4, in which case not only stop pins 320 but also the radial projections 310 will freely pass (with substantial clearance) over the upper flat surface 366 of blocking lever 340.

As may best be seen in FIG. 12, the blocking surface 364 of the vertically extending blocking portion 368 of lever 340 is preferably curved. In particular this surface 364 is preferably cylindrical, the axis of the cylinder being coincident with the pivot axis of lever 340, namely, along the central axis of pivot pin 342. Such curvature of blocking surface 364 insures that the rounded point or stop surface 324 of the next pin 320 to reach the blocking lever position will be stopped in exactly the same position in space whenever lever 340 is in the blocking position shown in FIGS. 11 and 12 and in solid lines in FIG. 4. A signal (for example a continuous d.c. voltage) supplied to input leads 370 to the active element (say the field winding) of the rotary solenoid at 354 will of course cause the rotary solenoid to rotate the blocking lever 340 from the position shown in solid lines in FIG. 4 (and in FIGS. 11 and 12) to the inactive position 340 shown in dotted lines in FIG. 4. In the absence of such an "unblocking" signal, the grating turret will be stopped, in a manner just previously described, whenever one of the seven lobes of the cam-like actuating plate 240 (see FIG. 7) causes the toggle lever and switch mechanism 260 to disconnect motor 80 and clutch 84 from driving relationship with the grating turret (as previously explained in relationship to FIGS. 9 and in particular 7).

Thus, in normal operating conditions, each of the lobes (e.g., lobe 241 in FIG. 7) will cause the switch 298 to disconnect the motor drive (80–84), while the spring (292) loaded toggle 260 will continue to urge the grating turret in the same rotative direction (e.g., clockwise in FIGS. 2, 4 and 7), until the next stop pin 310 (say the one shown at 311 in FIGS. 4, 11 and 12) is stopped in the precise manner just explained. In this way a particular grating (G1, for example, in FIG. 4) will be precisely positioned (in the circumferential direction relative to the grating turret) whenever the above-described actions occur. It may be noted that all motors, solenoids and clutches are not energized during the normal scanning, i.e., when the scanning arm is tilting the entire carousel and therefore the operative grating, (but are only powered or energized during changes of gratings and the like when no scanning is actually occurring). These potential sources of heat (that is electrically powered elements) are eliminated in the entire monochromator system during scanning; this lack of any source of thermally produced stress during actual wavenumber scanning contributes to the precision of the wavenumber "spectra" produced during scanning.

SCANNING ARM MOVEMENT AND GRATING RELATIONSHIPS

As may best be seen in FIG. 5, the main wavenumber scanning arm precisely rotates by means of its integral hub 400 about precision stationary hub-locating integral assembly, 94,96 by means of precision (pre-loaded) bearings 67 and 69. This causes not only the entire grating carousel 30 (including all of the carousel elements 50–60 and gratings G1–G7) but also all of the elements directly connected to the carousel (e.g., gear 60 and all of the elements shown in both FIGS. 7 and 8) as well as the other elements (e.g., those of FIGS. 11 and 12) directly connected to or integral with the various portions of the scanning arm 34 itself. Because of the fact that the hub 400, to which all of the elements mentioned in the previous sentence are either directly or indirectly attached, so as to rotate therewith, has its pivot axis coincident with the grating axis GA (compare FIG. 5 with FIGS. 3 and 4), the pivoting of the main scanning arm by whichever of the cam contour surfaces 44 or 46 is in operative driving engagement with the cam follower end 402 of the scanning arm (see FIGS. 4,5 and 6) will cause the grating in operative position OG (see FIGS. 3 and 4), assumed to be grating G1 in FIG. 5, to be tilted or pivoted about axis GA. Furthermore, because of the concentricity of not only the pivot axis of hub 400 and the grating axis GA, but also the mutual concentricity of shaft 64 and all of the elements attached thereto (e.g., gear 62 near its top and bevel gear 66 at its bottom), there is no "differential" gear effect between, say, pinion gear 62 and its driven gear 60 nor between bevel gear 66 and its drivingly mating bevel gear 68 since all of these elements merely rotate together about the common axis (of hub 400 and shaft 64). As may readily be seen in FIG. 6, the follower end 402 of the main wavenumber scanning arm 34 preferably carries a precision follower 36, comprising a precision roller cam follower 404 mounted in that end 406 of the scanning arm 34 which is remote from its connection to the carousel 30,50, etc. In particular, the precision cam roller 404 is preferably mounted by means of (low-friction) precision ball bearings, shown generally at 408 in FIG. 6. Although it has been assumed until this point, that the first (longest wavenumber) grating G1 is in the operative position, it may be noted that it is the longer outside cam contour 44 that will be used with the larger wavenumber (i.e., shorter wavelength) gratings G1, G2 and G3 (which may for example have 288 lines per millimeter, 144 lines per millimeter and 72 lines per millimeter, respectively); while it is the more rapidly changing (i.e., greater percentage change in radius per angular rotation movement of the cam) smaller cam contour 46 (see especially FIG. 4) that is intended to be utilized with the lower wavenumber (i.e., longer wavelength) gratings G4, G5, G6 and G7 (which may have respectively 18 lines per millimeter, 9 lines per millimeter, 4 ½ lines per millimeter and 2 ¼ per millimeter). As may be noted by these exemplary "ruling" factors, each of gratings G1, G2 and G3 are ideally suited for being utilized over a single octave each, all three octaves exactly meeting (i.e., each of the grating spectral sub-ranges are one octave each and form mathematically contiguous non-overlapping spectral segments). For exemplary grating line spacings of gratings G1–G3 just mentioned, grating G1 is particularly efficiently usable over the wavenumber range of from 4,000 to 2,000 wavenumbers (i.e., 2.5 microns through 5 microns in wavelengths) in the near infrared; grating G2 is ideally suited for use between 2,000 and 1,000 wavenumbers (i.e., from 5 to 10 microns in wavelength); and grating G3 is highly efficient between 1,000 and 500 wavenumbers (i.e., 10 to 20 microns). It is of course assumed that all of these gratings are "blazed", as is well known, so as to be particularly efficient in a particular order (in the exemplary embodiment the first order).

Although it would seem that the fourth grating G4 (which has only one-quarter as many lines per millimeter as grating G3) represents a skip in the octave relationship of the gratings, this is not actually true, in view of the fact that it is between gratings G3 and G4 that the main scanning arm is moved from a position in which it follows the large outside cam contour 44 (see FIG. 4) to the position, as shown in FIG. 6, in which the follower 36 (and in particular the precision follower roller 44) is drivingly engaged by the smaller inside cam contour 46 of cam 32. The particular, different but proportional, mathematical functions (which are both proportional to a cosecant function, so as to yield linear wavenumber as the cam 32 is rotated at a constant angular rate, as is well understood in the monochromator art) generated by the two cam contours 44 and 46 has a mutual proportionality factor of 2, so as effectively to cause scanning of grating G4 by contour 46 at only one octave difference from the grating G3 which is scanned according to contour 44. Since once the grating arm has been moved so as to engage the smaller inner cam contour 46 (upon the beginning of use of grating G4), this same smaller inner cam contour is utilized for the remaining gratings (G5–G7) as well. Since their grating line spacing is in mutually contiguous octave relationship, all seven gratings are utilized over a single octave, and in particular the single octave for which they are most efficient in the first order. Thus, grating G4 is utilized from 500 to 250 wavenumbers; grating G5 from 250 to 125 wavenumbers; grating G6 from 125 to 62 ½ wavenumbers and the last grating G7 is utilized from 62 ½ wavenumbers to (theoretically 31 ¼) but actually only to 31.3 wavenumbers (because of the use to the nearest whole 1/10 of a wavenumber in the wavenumber readout and the like).

Seven microswitches (of which only two at 440,442 are visible in FIG. 5) are rigidly attached to a plate 420 on the bottom 430 of the comparatively stationary (relative to the rotatable carousel or turret 30 about turret axis TA) connecting portion 61 or cylindrical or hub member 430 of the cam arm 34. In particular, each of the seven microswitches will be arranged on radial lines that form equal angles (namely 360° divided by 7) relative to the turret axis TA center line. In particular, the microswitch 440 shown in FIG. 5 is assumed to be the particular microswitch which is on the radial line connecting the center line of the turret axis TA to the mutually common (fixed in space) grating axis GA center line of shaft 64 and pivot axis of hub 400 (and therefore of all the elements connected to the scanning arm 34). The other shown microswitch 442 is merely representative of one of the other seven microswitches, namely one that is on a radial line from the carousel or turret axis TA of either three-sevenths of 360° or four-sevenths of 360° removed from the radial line on which microswitch 440 (as just defined) is positioned.

A microswitch tripping arm 450 is rigidly mounted (as by conventional means 452) on the lower end of the grating carousel or turret shaft 51, which rotates with the carousel 30 (i.e., elements 50-60 and gratings G1-G7). Therefore, the microswitch tripping arm 450 acts as an indexing pointer in conjunction with the relatively stationary seven microswitches (440, 442, etc.). In particular, in the position shown in FIG. 5, the microswitch tripping arm 450 (which is assumed in the exemplary embodiment to be on the radial line connecting the center line of grating G1 with the turret axis TA) will trip the particular microswitch 440; therefore in the exemplary assumed embodiment, the particular microswitch 440 is "associated" with the grating G1, since its actuating button 441 will be engaged by arm 450 whenever the carousel is in the position shown in FIG. 5 (i.e., with grating G1 in the operative grating position (compare FIGS. 3 and 4). Thus, the fact that switch actuating arm 450 closes the particular microswitch 440 will give an electrical signal over output lead 460 of this particular microswitch 440, indicating that it is grating G1 that is in such operative position.

Obviously, the other six relatively stationary microswitches (including switch 442 and the others not shown in FIG. 5) will be actuated in turn by the switch arm 450 as the carousel 30 is rotated so as to position a different grating (G2, G3, etc.) into the operative position (see FIGS. 2-4). In this manner the "indexing" or pointing switch actuating arm 450 will close one of the relatively stationary microswitches which is "associated" with each of the gratings. Therefore whenever a particular grating is in the operative position, one of the microswitches (440, 442, etc.) will be actuated, and which of such switches is actuated will indicate which of the gratings is in fact at the operative position OG (FIGS. 2-4).

Since these seven microswitches and the single rotating actuating arm 450 therefore supplies an indication of which of the gratings is in the operative position, the microswitch associated with grating G4 can supply a signal indicating that the scanning arm 34 should be moved so as to position its follower 36, 404 from following the outer larger cam contour 44 (used for gratings G1-G3) to the smaller internal cam contour surface 46 (which will be used not only for grating G4 but for the remaining gratings G5-G7 as well). By means of relatively simple control logic (as will be at least referred to hereinafter relative to the FIG. 15 of the drawing) the microswitch associated with grating G4 will cause an electrical signal to be generated which in turn will cause an electrical signal input over lead 462 to actuate a scanning arm change motor 460, which will ultimately rotate shaft 470, so as to cause a main scanning arm biasing means, including a negator spring 480 to effectively go from one over-center position to another, so as to effectively change the biasing force causing the cam follower 36 (see FIG. 4) from being pressed against the larger cam contour 44 to being resiliently urged against the smaller cam contour 46. Since the exact mechanism (involving elements 460-480) for accomplishing the purposes shown in FIG. 5, and the details thereof form no part of the present invention, this will not be further described in detail.

FILTER WHEEL DRIVE

As has already been broadly described relative to FIGS. 2-4, the filter wheel FW, as best seen in FIG. 13, may carry near its periphery a series of 14 filters, namely, 501, 502, 503 ... 513 and 514; and one additional circular aperture which contains no filter (i.e., is open) at 515. For exemplary purposes, it will be assumed that the filter wheel rotates clockwise as indicated by the filter wheel rotation direction FD in FIG. 13, so that the sequence of the filters entering the radiation at the exit slits XS (compare FIGS. 2 and 4 and in particular FIG. 3) will follow the numerical sequence of 501, 502, 503 etc. Further the filter 501 (assumed to be the one having the highest frequency (as measured in wavenumbers) cut-off filter and the next filter 502 having the next adjacent (still relatively high) wavenumber cut-off, will be the two filters associated with that grating (G1 in the exemplary embodiment) which has the closest grating line spacing (e.g., 144 lines per millimeter in the exemplary embodiment) so as to be that grating which is utilized at the highest wavenumber sub-range (say, 4,200 to 2,000 wavenumbers in the exemplary embodiment). Obviously then, filters 503 and 504 will be the two filters utilized with the next finest (e.g., 72 lines per millimeter) grating G2, which grating may be utilized between 2,100 and 1,000 wavenumbers, and so on. Merely for purposes of concreteness of description, in one exemplary embodiment (intended to be commercially marketed) where the highest wavenumber grating G1 is typically used over the wavenumber range of 4,000 to 2,000 (but capable of use to 4,200 wavenumbers), the highest wavenumber cut-off filter 501 utilized above 2,969.6 in this specific exemplary embodiment (so that the next filter 502 will be utilized from 2,969.6 wavenumbers to 2,000 wavenumbers). Generally speaking the filters should be changed at least near the geometric mean of the wavelength range of the grating with which each pair is utilized, (rather than the arithmetic means, i.e., average wavenumber), for reasons that will be understood by those skilled in the art of designing relatively sharp cut-off filters of the interference type which will pass only frequencies (wavenumbers) below a particular cut-off frequency. For a "one octave" grating range, the second (lower wavenumber) of each pair of filters utilized with a particular grating is preferably introduced in the vicinity of the geometric mean of this 2:1 wavenumber range (i.e., near the square root of 2 times the lower wavenumber limit of the grating range). In practice, as long as the individual filters have reasonably sharp cut-offs, the exact point of interchange of each of the filters is not extremely critical. However, it will be noted that in the exemplary embodiment, the interchange from the highest wavenumber filter 501 to the next highest filter 502 actually occurs at 2,969.6 wavenumbers, which is almost exactly the geometric mean of the usable range of 4,200-2,000 wavenumbers.

As will appear hereinafter with reference to FIG. 15, explaining the overall operation of the entire automatic scanning monochromator system, one of the generally radial line electrical contacts (224, etc.) of the low-speed encoder 220 of FIGS. 5, 14 and 15 may be conveniently used as the signal for changing the filters. In particular, the signal will preferably come from that contact (224, etc.) which represents approximately the half-way point in the rotation of cam 32 and therefore of the pick-off arm 230 rigidly rotating with said cam. In particular, where a 25 bar low-speed encoder is utilized, and only 23 of these 25 angular positions represent actual useful parts of the cam rotation (the remaining two bars representing the "flyback" or reset part of the cam), use of the changeover from the 10th to the 11th bar (as measured in the cam rotation direction causing the wavenumbers to go from their higher to their lower value, which is the normal scanning direction of the instrument) will yield almost exactly the ideal changeover point for not only the first (501) filter to the second (502) but for all odd-numbered filters to even-numbered filters at the geometric mean of the spectral (wavenumber) range of each of the consecutive gratings with which each pair of filters is associated. Obviously, any of the last, say, two bars (while the scanning arm is returning and the next grating is being placed in position) may be used to change the even-numbered filters (e.g., 502) to the next higher odd-numbered filters e.g., 503), which will then be the filter in use during the first half of the next (lower wavenumber) diffraction grating range.

As previously described with reference to FIGS. 2 and 4, the mechanical power required to drive the filter wheel is supplied rather simply by means of a motor 40, to the shaft (41) of which is attached a friction roller 42, directly engaging the peripheral edge surface 520 (compare FIGS. 4 and 13) as at 522 (see FIG. 13). To assure sufficient friction between roller 42 and peripheral edge 520, the motor 40 and the drive roller 42 attached thereto may both be supported near the (lefthand in FIG. 13) by one end of a seesaw-like lever 530, fulcrummed near its middle by a stationary pin 532, and resiliently biased about pivot 532 (in a clockwise direction as seen in FIG. 13) by a spring 534 bearing against the other (right-hand) reduced end 536 of lever 530. The enlarged head 538, acting as the backing member for spring 534, its rigid shaft 544, and the two upstanding parts 546, 548 of bracket 549, for rigidly supporting shaft 544 and pivot pin 532 respectively are both clearly shown in FIG. 13.

Of greater significance is the manner in which the motor 40 is controlled, for which reason the power leads thereto are both shown and referenced as 540,542 respectively, in both FIGS. 13 and 4. As will be explained in detail hereinafter, a series of (15 in the exemplary embodiment) microswitches are mounted on a stationary plate 550 in a circular array at mutually equal angular spacings, the central angle between microswitches therefore being the same as that between the different filters 501–514 and the opening 515 (see FIG. 13). Thus, each of the stationary microswitches, exemplary ones being seen at 552 and 554 in FIG. 4, may act as indexing means so as to indicate which of the filters is actually in the radiation beam (i.e., is in the operative filter OF position (which hereinafter will be assumed to be at least in the vicinity of filters 511, 512 as seen in FIG. 13). The rear surface (as best seen in FIGS. 4 and 13) of the filter wheel FW is provided with one single raised portion or bump 560 at a radial distance from its axis FA which is equal to the radial distance of the circumferentially arranged stationary microswitches 552,554, etc. Therefore, this raised portion 560 will discretely actuate one particular one of the 15 microswitches (552, 554, etc.) by pressing against its actuating pushbutton or arm (the actuating means of the particular switch 552 being indicated at 556). Closing of one of the microswitches (552, 554, etc.) will of course complete a signal through the respective output, 562, 564, etc., of that particular one of the 15 microswitches, thereby indicating the actual position of the filter wheel relative to the stationary plate 550 (and therefore indicating which filter is in the operative filter position OF).

As may best be seen in FIGS. 4 and 13, supporting plate 550 may be mounted by means of a bracket 566 and may assist in supporting a bearing mount 568, which in turn may rotatively support the shaft 570, defining the rotating axis (FA) of the filter wheel. Although the previously described bearings and tapered mating connections between mechanical parts of the cam and grating assemblies were required to maintain high precision, use of similar techniques in mounting the filter wheel is not required since its positioning is substantially less critical than the cam 32 position relative to its axis and its encoders and the gratings relative especially to their effective rotation axis (GA). If the filters are made somewhat larger than necessary to exactly intercept all of the radiation leaving the entrance slits XS (at their largest width setting), only moderate precision need be maintained in both the radial and circumferential directions in placing each filter in the operative filter position (OF).

As may be seen from this description of FIG. 13 (and with further reference to parts of FIG. 4), the output (562, 564, etc.) of the particular microswitch (552, 554, etc.) which represents the particular filter at the operative filter position OF will be encountered by the single switch actuating raised portion 560 of the filter wheel whenever a filter is in such operative position (OF), thereby indicating to the control or logic part of the apparatus which filter is so positioned, as well as enabling the control or logic circuit of the system to cause the motor 40 to rotate the filter wheel (by applying power over leads 540, 542) until the desired filter is in position (as determined by actuation of the "correct" microswitch associated with the desired filter).

OVER-ALL CONTROL AND OPERATION

FIG. 15 shows, mainly in block form but involving some schematically shown structure the over-all connections (mostly electrical) and operative relationships of the entire automatic scanning monochromator system (as incorporated for example in a spectrophotometer, and more particularly in one of the double-beam type). In order to save repetition of those parts which have already been described relative to either the optical schematic of FIG. 3 or more particularly the structural detail of FIGS. 2 and 4–14, the parts shown in FIG. 15 that are common to any of these earlier figures are merely referenced with the same numbers even though (because of the diagrammatic nature of FIG. 15) the corresponding elements may look entirely different in FIG. 15 from the earlier figures.

Rather than describing the new elements in FIG. 15, followed by a complete description of the operation, the description of FIG. 15 will rather start with the already described elements and explain the manner in which they are operatively connected to the (mainly block form) new elements in FIG. 15. Thus the stepping motor 600, not previously shown, will be connected to the input side (i.e., the generally right-hand side in FIG. 12) of the power transmission means 114, the ultimate output of which is shaft 112, connected through worm reduction means 106, 108 and shaft 100 to rotatively drive the main wavenumber scanning cam 32. As previously described, the low-speed encoder shown generally at 210 is directly connected to the lower end 100' of cam shaft 100 so as to be rotated at the same (relatively slow) angular rate. Output shaft 112 (rotating at a relatively high speed) is directly connected (at its other end 112') to the high-speed encoder 170, so as to yield at encoder output 200 a 10-bit (Grey) binary code indication of the angular position of the high-speed shaft 112, 112', thereby yielding a fine indication (to one part in 1,024). The low-speed encoder, the wiper 230 of which rotates at 1/25th of the rate of the high-speed shaft 112 (in the exemplary embodiment) yields as indication of in which of the 25 equal angular positions or sectors the relatively low-speed shaft 100 and therefore cam 32 is. Thus, the ability of the high-speed encoder to read the angular position of shaft 112 in parts of a total of 1,024 angular increments, combined with the low-speed encoder's ability to read (1/25th as fast) the position of the cam 32 and shaft 100, yields a readout of 25 times 1,024 or one part in 25,600 of the actual cam angular position. The Grey binary code output at 200 of the highspeed encoder (a Grey encoder being utilized because a 10-bit Grey binary encoder is much simpler and less expensive than a 10-bit binary encoder) is ultimately converted to conventional binary code, schematically illustrated as a Grey binary converter 610, the output 612 of which therefore supplies a 10-bit conventional binary code. The low-speed encoder (210) output, shown at 620 in FIG. 15, is of course a conventional decimal (Arabic) number (from 1 to 25) indicating which of the radial bar connections of the low-speed encoder is contacting the wiper 230. For reasons which will be obvious to those skilled in control and/or logic systems, this decimal number must be previously converted to binary code form, as schematically illustrated by the six-bit binary converter 624, before being combined with the binary output 612 of the highspeed encoder (over leads 626,628). Thus, the outputs of both encoders, after being converted to a common binary code form (of six and 10 bits, respectively) are fed as inputs at 612' and 628' to a say, 20-bit register.

It is now merely broadly mentioned that this 20-bit register may ultimately be presented as a five-digit decimal number at the wavenumber display 14 (and in particular in the exemplary instrument as a number having up to four places to the left of the conventional Arabic system decimal point and one to the right, so that in the specific exemplary embodiment the instrument would read out its own wavenumber from 4,200.0 down to its lowest usable wavenumber, say, 31.3). It should be noted that since the information derived consists of one part in 25,600, as previously noted, the monochromator is at least in theory capable of producing precision readout of its higher wavenumber range (i.e., in the vicinity of, say, 4,000.0 wavenumbers) of better than one part in 40,000 (i.e., 0.1 part in 4,000.0), so that the figure following the decimal point even at this upper wavenumber range is significant in the very last (i.e., the 10th) decimal place. Thus, the 16-bit information (or more specific exactly the 25 digital coarse or slow-speed encoder information times the 10-bit or 1.024 decimal digit information for the high encoder, equal to 25,600 decimal "-bits") is available to merely read the spectral sub-range (and wavenumbers) of a single grating. Thus even in the "worse" case of having to read the range from 4,200 down to 2,000 wavenumbers, there are 25,600 discrete decimal (Arabic) bits available, so that the instrument is at least in theory capable of reading the 2,200 wavenumber range (by means of a 25,600 discrete interval bits) to better than one decimal place (i.e., it is theoretically capable of reading 4,200.0 through 2,000.0 (a total range of 2,200.0) exactly since there are slightly more discrete bits than there are numbers in 2,200.0 discrete wavenumber 10ths).

A 20-bit register is utilized, although only fed at its two "-normal" inputs (612' and 628') by binary numbers of less than a full 16-bit binary capacity (since the 25,600 decimal system numbers actually utilized is less than the somewhat over 65,000 possible numbers that may be held by even a complete 16-bit binary register. The reasons that a 20-bit register 630 is utilized will be explained subsequently. It is now merely mentioned one of the reasons involves the fact that it is utilized as part of the conversion system from its conventional binary inputs 628, 628', and 612, 612' (which are essentially six-bit binary and 10-bit binary inputs respectively), which supply essentially a 16-bit binary signal, to a binary coded decimal (BCD) output at 632, as will be later explained.

In the somewhat schematically illustrated operational diagram of FIG. 15, the various grating indexing switches, two of which have been shown and described relative to FIG. 5 at 440 and 442 (and will be somewhat arbitrarily assumed to be the same ones labeled by the same numbers in FIG. 15) will indicate (by which of the switches is closed) which of the gratings is actually in the operative grating position OG. For exemplary purposes it will be assumed that the grating carousel is about to position the second grating G2 into operative position so that the indexing pusher 450 is about to close the second switch 642, so as to energize its output leads 662, thereby indicating that grating G2 is about to be positioned in the operative position OG. In the exemplary position shown in FIG. 15, as the grating carousel 30 continues to rotate slightly more clockwise in the grating direction GB, the second grating G2 will reach the operative position and pusher 450 will close the switch 642 associated with this second largest wavenumber grating G2, so as to indicate over its output leads 662 (forming one strand of the schematically shown cable 668) that it is the second grating G2 that is (about to be) in the operative position OG This information may be readily utilized by the general logic circuit, schematically illustrated as the instrument control logic 670 and fed back as a control signal to the 20-bit register at 674. This grating information in effect is utilized also, as schematically illustrated by input 672 to a binary to binary code decimal decode shift and adjust circuit 680 so as to cause the 20-bit register to the "shifted" one "octave" lower, every time a "lower octave" grating (i.e., one higher numbered grating; e.g., from grating G2 to grating G3) is moved into the operative grating position OG. Thus the schematically shown shift circuit 680 may by its operative connections 682, 684 to the register 630 cause it to move one octave (one binary digit place) for each grating change. In addition to cause this binary type of shift in register 630, the binary to BCD decode, shift and adjust circuit 680 also causes ultimately the output 632 of register 630 to be in binary coded decimal (BCD) form in a manner understood by those skilled in the logic system art.

Once the 20-bit binary register 630 has been shifted, by "knowing" what grating is in place (so as to be shifted one binary place or one octave by the means just described), its output at 632 will represent (in binary coded decimal form) exactly the true wavenumber presented by the particular grating (by means of exemplary switches 440, 442, 462 and the various leads therefrom) (over cable 668 and the elements 670–684 just described) at the gratings exact angular position and therefore its exact wavenumber (as determined by cam 32,) the low and high speed encoders (210, 170), and the various mechanical connections therebetween already described and the various electrical elements 610–630 just described. Thus the output at 632 will, because of the shiftable nature of the 20-bit register 630 and the circuitry just described supply a signal (in BCD form) form representing accurately the wavenumber of the combination of the "operative" grating and the exact cam position.

Although at no time can the output 362 actually be more precise than one part per the 25,600 actual decimal bits supplied by the cam readout encoders 210,170 this nevertheless represents a precision better than 1/100th of one percent of the cam position. Thus even when utilizing the, say, 4,200.0 to 2,000.0 (highest wavenumber) grating G1, the 2,200.0 possible wavenumbers are uniquely determined (to 0.01 of a wavenumber) since 25,600 bits are available (which is obviously more than the 22,000 bits necessary to represent 2,200.0 uniquely). Thus the precision of the readout is only limited by the available information, and not by the signal processing system, even though relatively simple elements (e.g., six-bit and 10-bit converters and a 20-bit register) are utilized. The binary coded decimal number at output 632 representing the wavenumber of the particular grating at its particular angle of tilt (as determined by the exact angular position of linear wavenumber cam 32) is then preferably converted by a binary coded decimal to decimal converter 690 to a five-digit decimal number, which therefore appears at both of its outputs 692 and 694. In particular the number will, in the exemplary embodiment, be within the range of, say, 4,200.0 to 0031.3. As just previously noted, the readout of the instrument is theoretically capable of higher precision than even the highest wavenumber representation (i.e., 4,200.0), but practically speaking, the precision of the mechanical parts cannot be made any better than this. Although it is true that the final readout only yields a precision of one part per 313 or only about one-third of one percent at the very low wavenumber end, for all practical purposes this is more than adequate, especially since linear wavenumber chart records, as broadly indicated at 16 in FIG. 11 cannot really indicate abscissa (wavenumber) values more precisely than one-tenth of a wavenumber, even when they are run at relatively slow speeds. It should be noted however that even at the lower end of the wavelength range (i.e., in the vicinity of 32.0 wavenumbers) the actual precision is higher than that read out for example on the display 14, so that the more precise information may be utilized either directly from the binary coded decimal output lead 632 in this form or by utilizing the information available in decimal form at lead 692 (or 694) to more than five total decimal digits (including zeros as to first significant figures) by means of simple shift register techniques at the lower wavenumber ranges.

The other output 694 of the binary to decimal converter is fed as one of the primary inputs to a comparator circuit 700. The other two lower inputs 702 and 704 are fed to the comparator circuit from, respectively, a high wavenumber limit or "switch register" 706 and a low wavenumber limit "switch register" 708. These may be manually set, as by thumb wheels, five digit decimal counters, as indicated at 706' and 708' in FIG. 1. The purpose of the comparator circuit 700 is to allow the operator to cause the instrument to be "indexed" to a manually set predetermined wavenumber (anywhere between, say, 4,200.0 and, say, 31.3) and to scan only this particular range. Thus the comparator circuit 700 will compare the digital number supplied by the binary coded decimal to decimal converter 690 over lead 694 representing the actual wavenumber setting of the instrument to the higher and lower desired wavenumbers of a particular range that the operator wishes to utilize the instrument. Thus the comparator circuit really will compare under two different circumstances the input 694 to that at 702 and under other circumstances the input 694 to that at 704, and in each case will supply a signal indicating that either these pairs of inputs are the same or not to the instrument logic control by means of lead 710.

The central part of the figure indicates that one of the outputs 712 of the instrument control logic may (more or less directly) supply a pulse to advance a, say, stepping motor chart drive 714 to incrementally move the chart recording paper (or the pen carriage) in the abscissa direction as schematically illustrated by its output 716 to the (chart) recorder 16 (see FIG. 1). The low-speed encoder 210 may supply directly (i.e., in conventional Arabic decimal form) over its output lead 720 an indication of which of its 25 radial contacts is being engaged by the wiping arm 230 and contact 232 (see FIGS. 5 and 14). This information may form an input 722 to filter logic circuit 730 to cause by its output 732 energizing of the filter drive motor 40 over its lead 540,542 (compare FIG. 15 to FIG. 4) to advance the filter whenever the low-speed encoder senses that the cam has made approximately one-half revolution (i.e., the grating is near its mid-range) or more exactly between its 10th and 11th of say 23 actual scanning radial bars (assuming that the 24th and 25th represent return or flyback of the scanning arm), as previously explained. The next filter switch closed will signal that the filter wheel has been advanced one filter "step" so as to stop the filter motor 40 by ultimately causing opening of the power circuit leads as schematically illustrated at 732.

To index the filter wheel at the start of a scanning operation (and especially one that does not start at one end, say, the highest wavenumber, of the entire range of the instrument), the aforementioned 15 filter switches (552, 554, etc.) are of course required, as schematically illustrated as a circular series of dots within block 740. For exemplary purposes, the particular switch 552 assumed to be closed by the switch actuator 560 is also indicated in this schematic block in FIG. 15. The output 742 of the filter switch block 740 schematically illustrates the output signal of whichever one of the filter switches is closed by actuator 560 (and therefore under the assumed exemplary conditions the output lead 562 of switch 552 in FIG. 4). An output from the instrument logic at 744 forms a further input 746 to the filter logic 730, which is utilized only for indexing filters in a manner which will be explained hereinafter more in detail; broadly however the schematically shown input signal 744, 746 to the filter logic is a command for the filter logic to drive the filter wheel (by means of its output 732 and the power inputs 540, 542 of the filter motor 40) until a particular filter is positioned in the operative filter position OF, as determined by the closing of the "correct" filter switch 552, 554, etc., as indicated by the schematically shown switch inputs 742 to the filter logic circuit 730.

In an analogous manner the upper output 748 from the instrument control logic 670 to the grating logic circuit 750 is primarily a command to cause the output 752 thereof to change gratings by actuating the grating motor 80 (and its electromagnetic clutch 84) by energizing, say, common lead 90 (see FIG. 9) even though the switch 298 (see FIG. 7) is supplying at its grating motor and clutch control output 90'. The output 752 will also of course energize solenoid input 370 of rotary solenoid 354 of solenoid assembly 350 to cause blocking arm 340 to move out of blocking position (see FIGS. 4, 11, and 12) to the unblocking position (dotted line position of arm 340 at 340' in FIG. 4) as previously described to allow rotation of the grating carousel 30, 50 a signal normally deenergizing input 90. Thus the previously described (relative to FIG. 7) normal mode of stepping from one grating to another during scanning, may be over-ridden by means of elements 748–752, so as to cause rotation of the grating carousel 30,50 by motor 80 whenever it is desired to "index" the carousel to a different grating position from the one present at the operative grating position OG. Thus whenever it is desired to rotate the grating carousel to a different grating, the instrument control logic can "command" the grating logic (by means of lead 748) to start moving the grating carousel (by energizing motor 80 and its clutch 84) until the particular grating desired is in position OG, which the instrument control logic "knows" because of the previously described action of the grating indexing switches and their outputs as fed by cable 668 to the instrument control logic.

It may be noted that FIG. 15 shows the grating indexing switches as being connected (by cable 668) to the instrument control logic rather than the grating logic, while the analogous (in function) filter switches (552, 554, etc.) schematically shown at 740 in FIG. 15 are shown as feeding their information directly to the filter logic circuit over lead 742. In a sense, either schematic representation could be utilized for either of these functions, since in each case it is the relatively simple task of determining when the grating or filter desired (during indexing of the instrument prior to use) has reached the operative position (OG and OF respectively) once the instrument control logic has "told" the grating logic and filter logic, respectively, to search for the proper grating and filter as determined by the high wavenumber limit 706 set into the instrument. Thus the showing of the grating indexing outputs over cable 668 as coming into the instrument control logic while the showing of the filter switches outputs at 742 going directly to the filter logic is somewhat arbitrary, since in a sense both perform analogous functions, and it is primarily the command from the instrument control logic to search that actuates both the grating motor 80 until the correct grating is "found" by the corresponding grating indexing switch being closed; and almost exactly the same type of action occurs when the instrument control logic commands (by lead 744,746) the filter logic to drive (by output 732) the filter (switching) drive motor (via power input leads thereto at 540,542).

The grating logic control (assuming as just previously explained that it actually has indirect access to or information from the grating indexing switches by means of cable 668 and the instrument control logic 670) is also able to determine when the scanning arm change motor 460 (see FIG. 5) should change the scanning arm 34 (by means of elements 470, 480) from the larger, less rapidly changing in effective radius outside cam contour surface 44 (compare FIGS. 4–6) to the smaller or interior cam contour surface 46 (FIGS. 4–6). In particular in the exemplary embodiment, as previously mentioned, it is assumed that this change-over should occur when the third grating G3 is moved out of the operative position and the fourth grating G4 is to be utilized (i.e., moved to OG). Thus the grating logic, assumed to "know" when the grating index switch associated with the fourth grating G4 is being closed (e.g., switch 442 in both FIGS. 15 and 5) will supply a signal on its second output 754, acting (indirectly typically) to actuate the scanning arm change motor 460 (as by its schematically shown actuating input lead 462 in FIG. 5). It should be noted that the scanning arm motor 460 will be so actuated by the grating logic whenever the appropriate grating (namely grating G4 in the exemplary embodiment) is introduced into the operative position, regardless of whether the instrument is actually scanning a spectrum or is merely being indexed to some particular wavenumber which is below the range utilized with gratings G1 – G3 (i.e., requires the use of any one of gratings G4–G7). The remaining output from the instrument control logic at 762 is the "command" or control input to wavenumber cam drive logic circuit 764. The output 766 of this circuit controls the input 768 of the (stepping) motor 600, which drives, as schematically illustrated by mechanical connection 601 the entire cam assembly structure (schematically shown as the entire upper quarter of the middle of FIG. 15 and involving all of the structure shown in FIG. 10 including the high-speed encoder 170, as well as the cam 32 and all of the connecting elements 100–108 and the moving parts 228, 230 of the low-speed encoder, all of which is shown in FIG. 5). Since the instrument control logic circuit has access, as schematically shown by input lead 695 to complete information from the high-speed and low-speed encoders (or by connecting leads directly from the encoders, not shown) of the exact angular position of the cam 32 at all times, it may command the wavenumber cam drive logic 764 to drive the stepping motor 600 until it has (relatively rapidly) rotated the cam 32 to the position to which the high wavenumber limit 706 has been set (that is until the comparator circuit 700 sends a signal over lead 710, indicating that the actual position of the cam as given by the decimal wavenumber input 694 is the same as requested by the indexing high wavenumber limit control 706). During an actual spectrum scan (i.e., when the instrument is actually being utilized rather than indexed to its starting position), the wavenumber cam drive logic 764 will of course supply the necessary signal to drive the (stepping) motor at a steady rate. In order to allow for different coarse scanning speeds (depending on whether the instrument, e.g., a spectrophotometer, is making a fast general survey or a very slow detailed analysis of a sample), a speed control 770 supplying a variable speed controlling signal over its output 772 to the wavenumber cam drive logic 764 is preferably provided. In fact in the instrument being readied for market to which the exemplary illustrated embodiment generally conforms, the speed control 770 is provided by means of a fine control (having a continuous range of from 1 to 10 and a series of multipliers of 1, 10, 100 and 1,000, thereby supplying the operator with a dynamic speed range choice of from 1 (i.e., 1 times 1) to 10,000 (i.e., 10 times 1,000). This speed control input 772 is effectively inoperative when the instrument is indexing to a starting position, under which circumstances it of course utilizes its highest speed regardless of the speed the operator wishes the subsequent operative scan to occur.

The only further elements that are (or in fact are capable of) being illustrated in FIG. 15 are the schematically illustrated "index" and "scan" control inputs at 780, 790 respectively, somewhat schematically shown as merely controlling in turn the instrument control logic. The purpose of the index control is of course to instruct the instrument (and in particular the automatic scanning monochromator thereof) to go to the wavenumber set in the high wavenumber limit switch "register" 706 (the instrument being assumed to always scan from the highest wavenumber down to the lowest wavenumber requested). The instrument will then cause the proper grating (although in the commercial instrument the grating range is really set as part of the manually controlled high wavenumber limit series of disc-like hand knobs or dials), the proper filter and the proper angular setting of the cam so as to cause the instrument to "index" to the requested wavenumber in the high wavenumber limit register 706. When the instrument has reached this condition, it will then be ready to scan from this high wavenumber to any lower wavenumber (and in particular the one manually set by a series of similar hand wheels or discs into the low wavenumber limit or register 708) when the operator actuates the scan button 790; alternatively the instrument can be caused to start scanning as soon as it is ready by providing an automatic start scan signal as soon as the indexing is complete (i.e., as soon as comparator circuit 700 has determined that the instrument is "set").

EXEMPLARY OPERATION

In order to cause the instrument to index to a particular starting "high" wavenumber, the operator will dial into the high wavenumber limit or register the desired wavenumber range (which chooses the grating) and the exact desired wavenumber on the console (see FIG. 1 as schematically illustrated at 706') (thereby setting the high wavenumber limit in 706 in FIG. 15); the operator will normally also set a low wavenumber limit by analogous means of operating a similar series of rotatable thumb or hand wheels, schematically illustrated at 708' in FIG. 1 so as to set the lower wavenumber limit register 708 to any desired (grating and) specific wavenumber. The operator will then press the index command button 780' in FIG. 1, which will then cause the instrument to perform the following functions automatically.

First the instrument control logic 670 will order the grating logic by lead 748 to initiate rotation of the grating carousel (always clockwise in the exemplary embodiment) by actuation of motor 80 and clutch 84, until the particular grating indexing switch 440, 442, 642, etc. (compare FIG. 15 and FIG 5) indicates to the instrument control logic and/or the grating logic (670, 750, respectively in FIG. 15) that the proper grating is in position. At this point the instrument control logic will next actuate the indexing of the cam by sending a command over the wavenumber cam drive logic lead 762 to cause the cam to rotate until it has reached the position such that the wavenumber as read from the binary to decimal converter 690 over lead 694 by the comparator 700 matches the operator selected wavenumber in the "high" wavenumber register 706. The third command from the instrument control logic will be over lead 744, 746 to the filter logic to search for the correct filter, by actuating the filter wheel drive motor 40 by means of filter logic output 732 controlling the energizing inputs 540, 542 to this motor; as previously noted the filter logic can readily determine when the proper filter is in place in view of the fact that the "correct" filter switch 552, 554, etc. will be actuated when the desired filter has been brought to the operative filter position OF. The instrument has then reached the requested "high wavenumber" at which the actual scanning of the spectrum will start. After a predetermined fixed delay built into the instrument control logic to insure that the instrument is in fact "ready," a light on the translucent scan button 790' (see FIG. 1) will indicate to the operator that the instrument is now ready to perform the scan.

Pressing of the scan button 790' will then cause the instrument to start its (downward in wavenumber) scanning at a rate determined by the speed control setting, which may consist of for example a notched coarse or multiplier control 770' (having readable settings of 1, 10, 100 and 1,000) and a continuous fine speed control 770''. Assuming that the requested start position is arbitrarily in mid-range of both a grating and a filter, the (stepping) motor 600 will now start rotating the cam 32 at a rate determined by the speed control in such a direction as to cause the particular grating being utilized to decrease in a linear manner with time the wavenumber of the monochromatic radiation leaving the exit slit (and passing through the operative filter OF). At all times the comparator circuit 700 is comparing the (decimally read) wavenumber of such monochromatic radiation (by means of the outputs from both the low- and high-speed encoders, the various converters and other elements already described in FIG. 15) ultimately fed to the comparator by lead 694, with the low wavenumber limit fed to comparator circuit by lead 704 from the low wavenumber manually set register 708. If at any time the two numbers match, the comparator circuit will of course tell the instrument control circuit to stop all operations since the desired wavenumber spectral interval will have been completed. Assuming that this does not happen at least for a while, the instrument control logic itself will keep sampling the decimal wavenumber readout over lead 695, in order to determine when a grating change is required. In particular assuming that the first grating G1 is intended to be utilized down to 2,000 wavenumbers, the next grating G2 to 1,000 wavenumbers, the third grating G3 to 500 wavenumbers, and so on (so that each grating is used only over a single octave as previously described), then the instrument control logic will command a grating change at its grating logic output 748 whenever the decimally expressed wavenumber at input 695 reaches a value of 2,000.0 divided by N wavenumbers, where N equals in turn 1, 2, 4, 8, 16, etc. Obviously a grating change will also be accompanied by a filter change (since the filters change twice as often as the gratings) in the exemplary embodiment. Additionally if the instrument control logic receives over input 695 an indication that the wavenumber has reached a value of 2,969.6 divided by N (wherein N again may be any one of the numbers in the geometric series of 1, 2, 4, 8, etc.), it will supply a filter change command signal over leads 744, 746 to the filter logic 730 to change filters (these being the changes from odd numbered filters in FIG. 11 to even numbered filters occurring at the (geometric) middle of the wavenumber range of each of the gratings). Since the exact point of filter change is not critical, the same result may be obtained by utilizing as the filter changing signal the effective almost mid-point and effective end (i.e., the 10 to 11 and 23 to 24 bar) signal from the low-speed encoder; similarly it is completely practical to utilize the last (say, 23rd) scan bar of the low speed encoder to change the grating as well.

EXAMPLE OF OPERATION

Because of the relatively complex nature of the system, as already described in schematic form relative to FIG. 15, a short general summary followed by a single specific numerical example are now given to assist in understanding how the complex device operates. As will be recalled, each grating is utilized for one full turn of the main cam 32, corresponding to one full turn of the low-speed encoder 210 and 25 turns of the high-speed encoder 170. Since the encoders are "ignorant" of which grating is being rotated, they of course generate the same information, solely determined by the exact angular position of the cam 32, regardless of which grating is being scanned thereby.

As an example, let it be assumed that the first grating G1 is at such an angular position (because of the angular position of can 32) that the radiation at the exit slit is exactly 3,600.0 wavenumbers. The low-speed encoder, (which supplies the "-first" six most significant binary bits over leads 626, 628, 628' to register 630) will then be in such position as to indicate that its 17th (of 25) highest wavenumber segment is opposite the encoder pick-off 232. Therefore, the first six most significant binary bits supplied (at 628') to register 630 will be in the binary code form of 100011. This will represent, since there is a positive bit in the 16th most significant bit location (valued at 32,768 in normal decimal numbers), a positive bit in the 12th most significant location (valued at 2,048), and a positive bit in the 11th most significant binary bit location (valued at 1,024), a decimal number equal to 32,768 plus 2,048 plus 1,024, or a total of 35,840 of the required 36,000 decimal "-bits" to represent 3,600.0 wavenumbers. The high-speed encoder which supplies the next 10 binary bits (so that its highest or 10th bit represents 512 in decimal form) will provide the necessary 160 additional decimal "counts." Specifically, the output of the high-speed encoder will be, in Grey code form, 0011110000 at output 200, which after it has been converted from Grey to binary form will appear at input 612' as the 10-bit binary "number" 0010100000. The signal at 672, 674, which represents which grating is actually being utilized will in this instance cause 31 shifts and adjusts of register 630 by means of circuit 680 (and its operative connections 682,684) so as to yield in binary coded decimal form 0011–0110–0000–0000–0000, so that the first binary coded decimal group (of four) representing the first (most significant) decimal digit will be decoded by circuit 690 as a 3, the second most significant group (of four) binary coded decimal bits will yield the next most significant place) decimal value 6, while the remaining three empty binary boded decimal groups (of four) will yield of course zeroes in the last three places (in decimal form also), thus generating the decimal number at outputs 692 and 694 of 3,600.0.

The main effect of changing gratings from the largest wavenumber grating G1 is to reduce the 31 shifts and adjusts just mentioned to 29 shifts and adjusts for the second grating G2; similarly only 27 shifts and adjusts will occur when the third grating G3 is operative, and so on (two less shifts and adjusts being used for each of the next succeeding lower wavenumber gratings G4, G5, G6 and G7). Thus, when grating G2 (having a nominal wavenumber range of, say, 2,000 to 1,000) is used, the 29 shifts will cause the final output to be 1,800.0 wavenumbers (i.e., one-half of the above 3,600.0) because of the two less shifts.

What is claimed is:

1. An automatic scanning monochromator system comprising:

means for commonly mounting a plurality of more than two primary dispersive elements;

means for supplying a radiation beam intended to be dispersed;

means for movably supporting said common mounting means, in such manner as to allow movement thereof to position each of said dispersive elements into a particular single operative position in said radiation beam;

a prime mover operatively connected to said mounting means, for supplying mechanical power to move said mounting means, so that any one of said dispersive elements may be moved into said operative position;

a single wavenumber scanning arm effectively operatively connected to said common mounting means;

pivot means for pivotably mounting said scanning arm about a first pivot axis;

scanning means drivingly connected to said scanning arm, for tilting said arm about said first pivot axis, so that a single scanning arm causes tilting of said primary dispersive elements, including the particular dispersive element in said operative position;

said single scanning arm being rigidly connected to said supporting means for said common mounting means;

said common mounting means comprising a rotatable carousel-like table;

said prime mover being mounted on a fixed frame and operatively connected in driving relationship to said common mounting means through at least one intermediate rotatable mechanical power transferring means;

said intermediate rotatable power transferring means having an effective axis of rotation;

said effective axis of rotation being coincident with said first pivot axis, about which said scanning arm is pivotably mounted, whereby said rotatable table means may be rotatably moved so as to position any one of said primary dispersive elements into said operative position, regardless of the particular pivotable position of said scanning arm.

2. An automatic scanning monochromator system comprising:

means for commonly mounting a plurality of more than two primary dispersive elements;

means for supplying a radiation beam intended to be dispersed;

means for movably supporting said common mounting means, in such manner as to allow movement thereof to position each of said dispersive elements into a particular single operative position in said radiation beam;

a prime mover operatively connected to said mounting means, for supplying mechanical power to move said mounting means, so that any one of said dispersive elements may be moved into said operative position;

a single wavenumber scanning arm effectively operatively connected to said common mounting means;

pivot means for pivotably mounting said scanning arm about a first pivot axis;

scanning means drivingly connected to said scanning arm, for tilting said arm about said first pivot axis, so that a single scanning arm causes tilting of said primary dispersive elements, including the particular dispersive element in said operative position;

said scanning means for drivingly tilting said wavenumber scanning arm comprising a main scanning cam;

said main cam comprising a single rigid cam component;

said cam component comprising at least two physically separate, non-intersecting cam contour surfaces;

said single wavenumber scanning arm comprising a follower portion, positioned to engage said cam contour surfaces;

and an auxiliary moving means being operatively connected to said scanning arm to cause said follower portion of said scanning arm to engage a particular one of said cam contour surfaces.

3. An automatic scanning monochromator system comprising:

means for commonly mounting a plurality of more than two primary dispersive elements;

means for supplying a radiation beam intended to be dispersed;

means for movably supporting said common mounting means, in such manner as to allow movement thereof to position each of said dispersive elements into a particular single operative position in said radiation beam;

a prime mover operatively connected to said mounting means, for supplying mechanical power to move said mounting means, so that any one of said dispersive elements may be moved into said operative position;

said mounting means comprising a rotatable carousel-like table;

said movably supporting means thereby comprising means for rotatably supporting said table;

a precision indexing means comprising a movable arresting means, said arresting means being movable into a first blocking position and into a second disengaged position;

said movable arresting means of said precision indexing means rigidly engaging said movable carousel-like table in its direction of rotation when said arresting means is in said first blocking position, so that said precision indexing means stops said carousel-like table in a series of specific discrete angular locations, each of which corresponds to positioning of a different one of said dispersive elements exactly in the same said operative position;

said precision indexing means further comprising a plurality of stop means rigidly attached to said rotatable carousel-like table;

said arresting means being so movably mounted that said first blocking position is in the path of said stop means, so that when said movable arresting means rigidly engages said stop means in said blocking position, said carousel-like table is stopped in specific angular locations with one of said dispersive means exactly in the same said operative position;

said precision indexing means further comprising a cam-like plate element, rigidly attached to said rotatable table;

said cam-like plate comprising a series of substantially identical cam-like lobes peripherally spaced therearound;

and said precision indexing means additionally comprising a resiliently urged pivotable lever having a follower portion resiliently urged against said peripherally arranged lobes of said cam-like plate, whereby said resiliently urged pivotable lever urges said rotatable table in such direction as to cause said stop means to be pressed against said blocking arresting means.

4. An automatic scanning monochromator system according to claim 3, in which:

said prime mover comprises an electric motor having a control circuit controlling its input;

said resiliently urged pivotable lever comprises a switch actuating portion;

an electrical switch is provided, having a switch arm positioned adjacent said switch actuating portion of said pivotable arm;

said electrical switch is in said control circuit and therefore controls said electric motor, whereby said lobes cause said pivotable arm to move into such position that said switch actuating portion moves said switch arm, so as to actuate said switch and to disconnect said electrical input from said electric motor when said rotatable table is rotated to one of a series of angular locations.

5. An automatic scanning monochromator system according to claim 4, in which:

said cam-like lobes of said cam-like plate are of such shape, that said switch actuating portion of said resiliently urged lever moves said switch arm of said electrical switch to disconnect said electric input to said electric motor at each of said series of angular locations somewhat in front of the corresponding one of said specific discrete locations at which said arresting means rigidly engages one of said plurality of stop means, whereby said electric motor is electrically disconnected before engagement of said stop means by said arresting means, and solely said resiliently urged pivotable lever urges said stop means to be pressed against said arresting means when said rotatable carousel-like table is stopped.

6. An automatic scanning monochromator system comprising:

means for commonly mounting a plurality of more than two primary dispersive elements;

means for supplying a radiation beam intended to be dispersed;

means for movably supporting said common mounting means, in such manner as to allow movement thereof to position each of said dispersive elements into a particular single operative position in said radiation beam;

a prime mover operatively connected to said mounting means, for supplying mechanical power to move said mounting means, so that any one of said dispersive elements may be moved into said operative position;

said mounting means comprising a rotatable carousel-like table;

said movably supporting means thereby comprising means for rotatably supporting said table;

a precision indexing means comprising a movable arresting means, said arresting means being movable into a first blocking position and into a second disengaged position;

said movable arresting means of said precision indexing means rigidly engaging said movable carousel-like table in its direction of rotation when said arresting means is in said first blocking position, so that said precision indexing means stops said carousel-like table in a series of specific discrete angular locations, each of which corresponds to positioning of a different one of said dispersive elements exactly in the same said operative position;

said precision indexing means further comprising a plurality of stop means rigidly attached to said rotatable carousel-like table;

said arresting means being so movably mounted that said first blocking position is in the path of said stop means, so that when said movable arresting means rigidly engages said stop means in said blocking position, said carousel-like table is stopped in specific angular locations with one of said dispersive means exactly in the same said operative position;

said arresting means comprising a pivoted lever arm, pivotably movable into said blocking position about an axis;

said movable arresting means further comprising a blocking surface which is engaged by said stop means when said arresting means is pivoted into its blocking position;

and said blocking surface being a surface of revolution concentric to said axis of said pivoted lever arm, whereby when said pivoted lever arm is in its blocking position, said carousel-like rotatable table is stopped in the same position even if said pivoted lever arm is in a somewhat different angular position relative to its axis.

* * * * *